United States Patent
Lin et al.

(10) Patent No.: US 12,323,918 B2
(45) Date of Patent: *Jun. 3, 2025

(54) METHOD FOR TRANSMITTING WAKE-UP PACKET IN COMMUNICATIONS SYSTEM, AND DEVICE

(71) Applicant: Huawei Technologies Co., Ltd., Shenzhen (CN)

(72) Inventors: Meilu Lin, Shenzhen (CN); Ming Gan, Shenzhen (CN); Yuchen Guo, Shenzhen (CN); Xun Yang, Shenzhen (CN); Yun Liu, Shenzhen (CN); Jian Yu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,976

(22) Filed: Aug. 26, 2022

(65) Prior Publication Data

US 2023/0067562 A1   Mar. 2, 2023

Related U.S. Application Data

(63) Continuation of application No. 16/475,628, filed as application No. PCT/CN2017/089953 on Jun. 26, 2017, now Pat. No. 11,452,042.

(30) Foreign Application Priority Data

Aug. 15, 2016   (CN) .......................... 201610674267.8

(51) Int. Cl.
 *H04W 52/02*   (2009.01)
 *H04B 7/06*   (2006.01)
 *H04L 27/26*   (2006.01)

(52) U.S. Cl.
 CPC ...... *H04W 52/0235* (2013.01); *H04B 7/0617* (2013.01); *H04L 27/2627* (2013.01); *H04W 52/0248* (2013.01)

(58) Field of Classification Search
 CPC ......... H04W 52/0235; H04W 52/0248; H04W 84/12; H04W 88/06; H04B 7/0617; H04L 27/2627

See application file for complete search history.

(56) References Cited

U.S. PATENT DOCUMENTS

| | | | |
|---|---|---|---|
| 6,377,609 B1 * | 4/2002 | Brennan, Jr. | H04B 1/7156 375/141 |
| 7,061,976 B1 * | 6/2006 | Petranovich | H04L 25/0262 375/233 |

(Continued)

FOREIGN PATENT DOCUMENTS

| | | |
|---|---|---|
| CN | 104301973 A | 1/2015 |
| CN | 104838700 A | 8/2015 |

(Continued)

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Std 802.11™-2012 (Revision of IEEE Std 802.11-2007), Total 2793 pages (Mar. 29, 2012).

(Continued)

*Primary Examiner* — Christine Ng
(74) *Attorney, Agent, or Firm* — Leydig, Voit & Mayer, Ltd.

(57) ABSTRACT

This application provides a method for transmitting a wake-up packet in a communications system and a device. The communications system includes a transmit end device and a receive end device. The receive end device includes a (Continued)

wake-up receiver and a main transceiver. The method includes: sending, by the transmit end device, a first wake-up packet WUP to the wake-up receiver by using a first data rate; determining, by the transmit end device, a second data rate; and sending, by the transmit end device, a second WUP to the wake-up receiver by using the second data rate. The transmit end device can determine a proper data rate for sending a wake-up packet based on a specific transmission condition in a communication process, thereby improving transmission efficiency of the wake-up packet.

20 Claims, 9 Drawing Sheets

(56) References Cited

U.S. PATENT DOCUMENTS

| | | | |
|---|---|---|---|
| 9,485,733 B1* | 11/2016 | Park | H04W 52/0235 |
| 9,954,771 B1* | 4/2018 | Levy | H04L 49/3063 |
| 9,974,023 B2* | 5/2018 | Min | H04W 72/042 |
| 2004/0090929 A1* | 5/2004 | Laux | H04W 24/00 370/311 |
| 2004/0204181 A1* | 10/2004 | Cromer | H04W 52/0277 455/574 |
| 2005/0105589 A1 | 5/2005 | Sung et al. | |
| 2005/0201287 A1* | 9/2005 | Welborn | H03H 17/0254 370/235 |
| 2006/0012476 A1* | 1/2006 | Markhovsky | G01S 13/74 342/146 |
| 2006/0083159 A1* | 4/2006 | Laroia | H04L 27/2601 370/208 |
| 2007/0224947 A1 | 9/2007 | Campbell et al. | |
| 2008/0117878 A1* | 5/2008 | Kim | H04W 36/02 370/352 |
| 2009/0109945 A1 | 4/2009 | Lakkis | |
| 2010/0211597 A1* | 8/2010 | Huoviala | H04L 47/785 707/769 |
| 2011/0274216 A1 | 11/2011 | Seshadri et al. | |
| 2011/0317600 A1* | 12/2011 | Thomson | H04B 1/005 370/311 |
| 2012/0059952 A1* | 3/2012 | Kim | H04L 47/263 709/233 |
| 2012/0069893 A1* | 3/2012 | Shirakata | H04L 27/06 375/239 |
| 2013/0250904 A1* | 9/2013 | Kang | H04L 1/1685 370/329 |
| 2014/0204822 A1 | 7/2014 | Park et al. | |
| 2014/0269385 A1* | 9/2014 | Kalkunte | H04W 24/08 370/252 |
| 2014/0269666 A1* | 9/2014 | Marsh | H04L 27/2613 370/350 |
| 2015/0326340 A1* | 11/2015 | Huang | H04L 25/0242 375/267 |
| 2016/0198417 A1 | 7/2016 | Park et al. | |
| 2016/0278013 A1* | 9/2016 | Shellhammer | H04W 52/0225 |
| 2016/0373215 A1* | 12/2016 | Nan | H04L 1/08 |
| 2017/0055217 A1* | 2/2017 | Sen | H04W 40/005 |
| 2017/0339692 A1* | 11/2017 | Chun | H04W 72/0446 |
| 2018/0076905 A1 | 3/2018 | Akita | |
| 2020/0084718 A1* | 3/2020 | Wilhelmsson | H04L 5/0007 |

FOREIGN PATENT DOCUMENTS

| | | |
|---|---|---|
| CN | 104917619 A | 9/2015 |
| CN | 105703992 A | 6/2016 |
| EP | 3035605 B1 | 3/2019 |
| JP | 2012175534 A | 9/2012 |
| JP | 5391460 B2 | 1/2014 |
| WO | 2012010676 A1 | 1/2012 |
| WO | 0215435 A1 | 2/2022 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 Ghz," IEEE Std 802.11ac™-2013, Total 425 pages (Dec. 11, 2013).

* cited by examiner

| Byte count | 2 | 2 | 0 or 6 | 0 or 6 | 0 or 6 | 0 or 2 | 0 or 6 | 0 or 2 | 0 or 4 | Varible | 4 |
|---|---|---|---|---|---|---|---|---|---|---|---|
| | Frame control | Duration/ Identifier | Address 1 | Address 2 | Address 3 | Sequence control | Address 4 | Quality of service control | High throughput control | Frame body | Frame check sequence |

FIG. 7

| Receive end device groups with different rates | Different receive end devices with a same rate |
|---|---|
| 00: Group with a rate 1<br>01: Group with a rate 2<br>10: Group with a rate 3<br>11: Group with a rate 4 | 11111111...: Receive end device 1<br>10111111...: Receive end device 2<br>11011111...: Receive end device 3<br>10011111...: Receive end device 4<br>.<br>.<br>. |
FIG. 15
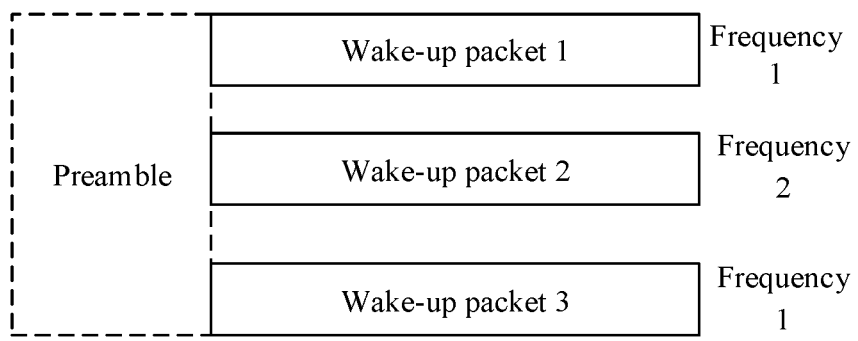
FIG. 16
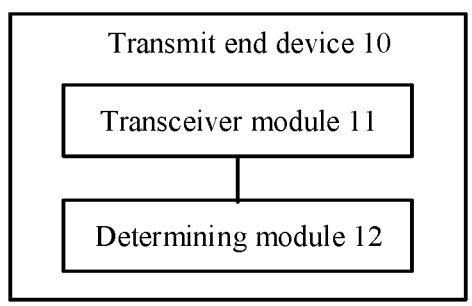
FIG. 17

METHOD FOR TRANSMITTING WAKE-UP PACKET IN COMMUNICATIONS SYSTEM, AND DEVICE

CROSS-REFERENCE TO RELATED APPLICATIONS

This application is a continuation of U.S. patent application Ser. No. 16/475,628, filed on Jul. 2, 2019, which is a national stage of International Application No. PCT/CN2017/089953, filed on Jun. 26, 2017, which claims priority to Chinese Patent Application No. 201610674267.8, filed on Aug. 15, 2016. All of the aforementioned applications are hereby incorporated by reference in their entireties.

TECHNICAL FIELD

Embodiments of this application relates to the communications field, and more specifically, to a method for transmitting a wake-up packet in a communications system, and a device.

BACKGROUND

A device deployed in a communications system usually needs a relatively long service life, which requires that the device have extremely low power consumption. A direct method for reducing power consumption is to prevent receive and transmit links of the device from being in an active state all the time. For the transmit link, the device may autonomously control itself to wake up in the active state when there is data that needs to be sent. For the receive link, a commonly used method is that the device is always in a sleep state, and is woken up when there is data that needs to be received. Because the device cannot determine a time at which data needs to be received, sleep efficiency and a data transmission latency both need to be considered when a sleep/wake-up mode is designed.

In a sleep/wake-up mode, a wake-up radio (Wake Up Radio, "WUR" for short) with low power consumption is introduced. The WUR may continuously perform link listening at extremely low power, and after detecting a wake-up packet, wake up a main radio to perform normal data exchange. In this sleep/wake-up mode, how to improve efficiency of transmitting the wake-up packet is an urgent problem needing to be resolved.

SUMMARY

This application provides a method for transmitting a wake-up packet in a communications system, and a device, to improve efficiency of transmitting a wake-up packet in a communications system.

According to a first aspect, a method for transmitting a wake-up packet in a communications system is provided. The communications system includes a transmit end device and a receive end device, the receive end device includes a wake-up receiver and a main transceiver, and the method includes: sending, by the transmit end device, a first wake-up packet WUP to the wake-up receiver by using a first data rate; determining, by the transmit end device, a second data rate; and sending, by the transmit end device, a second WUP to the wake-up receiver by using the second data rate.

Therefore, according to the method for transmitting a wake-up packet in a communications system in this application, the transmit end device can send wake-up packets to the receive end device by using different data rates, so that the transmit end device can determine, based on a specific transmission condition in a communication process, a proper data rate for sending a wake-up packet, thereby improving efficiency of transmitting the wake-up packet.

With reference to the first aspect, in a first possible implementation of the first aspect, the sending, by the transmit end device, a first wake-up packet to the wake-up receiver by using a first data rate includes: sending, by the transmit end device, the first WUP to the wake-up receiver by using a first symbol rate; and the determining, by the transmit end device, a second data rate, and sending, by the transmit end device, a second WUP to the wake-up receiver by using the second data rate includes: determining, by the transmit end device, a second symbol rate; and sending, by the transmit end device, the second WUP to the wake-up receiver by using the second symbol rate.

With reference to the first aspect or the first possible implementation of the first aspect, in a second possible implementation of the first aspect, the sending, by the transmit end device, a first wake-up packet WUP to the wake-up receiver by using a first data rate includes: sending, by the transmit end device, the first WUP to the wake-up receiver by using a first modulation and coding scheme; and the determining, by the transmit end device, a second data rate, and sending, by the transmit end device, a second WUP to the wake-up receiver by using the second data rate includes: determining, by the transmit end device, a second modulation and coding scheme; and sending, by the transmit end device, the second WUP to the wake-up receiver by using the second modulation and coding scheme.

It may be understood that in this application, that the data rates used when the transmit end device transmits the wake-up packets at the two times are different may be specifically as follows: The symbol rates used when the wake-up packets are transmitted at the two times are different, and/or the modulation and coding schemes used when the wake-up packets are transmitted at the two times are different.

With reference to the first aspect, or either of the first or the second possible implementation of the first aspect, in a third possible implementation of the first aspect, the determining, by the transmit end device, a second data rate includes: determining, by the transmit end device, the second data rate based on a data rate used when the transmit end device sends data to the main transceiver.

With reference to the first aspect, or either of the first or the second possible implementation of the first aspect, in a fourth possible implementation of the first aspect, the determining, by the transmit end device, a second data rate includes: determining, by the transmit end device, the second data rate based on an operating frequency band of the main transceiver and/or an operating frequency band of the wake-up receiver.

With reference to the first aspect, or either of the first or the second possible implementation of the first aspect, in a fifth possible implementation of the first aspect, the determining, by the transmit end device, a second data rate includes: determining, by the transmit end device, a symbol length corresponding to the second data rate based on a multipath delay spread.

Optionally, the multipath delay spread is a multipath delay spread in a short range (an indoor environment), or the multipath delay spread is a multipath delay spread in a long range (an outdoor environment), or the multipath delay spread is a multipath delay spread in a current communication environment.

With reference to the first aspect, or either of the first or the second possible implementation of the first aspect, in a sixth possible implementation of the first aspect, the determining, by the transmit end device, a second data rate includes: receiving, by the transmit end device, feedback information sent by the receive end device by using the main transceiver; and determining, by the transmit end device, the second data rate based on the feedback information.

Optionally, the feedback information sent by the receive end device to the transmit end device by using the main transceiver includes information used to indicate a data rate expected by the receive end device.

With reference to the sixth possible implementation of the first aspect, in a seventh possible implementation of the first aspect, the feedback information includes first information used to indicate a signal-to-noise ratio on an operating frequency of the main transceiver and/or the wake-up receiver; and the determining, by the transmit end device, the second data rate based on the feedback information includes: determining, by the transmit end device, the second data rate based on the first information and a correspondence between a signal-to-noise ratio and a data rate.

In this way, a feedback mechanism in 802.11 may be reused to simplify implementation of the receive end device.

With reference to the sixth possible implementation of the first aspect, in an eighth possible implementation of the first aspect, the feedback information includes second information used to indicate a power of the first WUP when the first WUP arrives at the wake-up receiver, and the determining, by the transmit end device, the second data rate based on the feedback information includes: determining, by the transmit end device, the second data rate based on the second information and a preset power threshold; or the feedback information includes third information used to indicate a signal-to-noise ratio of the first WUP at the wake-up receiver, and the determining, by the transmit end device, the second data rate based on the feedback information includes: determining, by the transmit end device, the second data rate based on the third information and a preset signal-to-noise ratio threshold; or the feedback information includes fourth information used to indicate a packet error rate of the first WUP at the wake-up receiver, and the determining, by the transmit end device, the second data rate based on the feedback information includes: determining, by the transmit end device, the second data rate based on the fourth information and a preset packet error rate threshold.

With reference to any one of the sixth to the eighth possible implementations of the first aspect, in a ninth possible implementation of the first aspect, the receiving, by the transmit end device, feedback information sent by the receive end device by using the main transceiver includes: receiving, by the transmit end device, a medium access control MAC frame sent by the receive end device by using the main transceiver, where the MAC frame carries the feedback information.

Optionally, the MAC frame includes an information element (Information Element, IE), the IE includes an information field, and the information field carries the feedback information.

With reference to the ninth possible implementation of the first aspect, in a tenth possible implementation of the first aspect, the receiving, by the transmit end device, a medium access control MAC frame sent by the receive end device by using the main transceiver includes: receiving, by the transmit end device, a quality of service QoS data frame sent by the receive end device by using the main transceiver, where the QoS data frame includes a high throughput control field, and the high throughput control field carries the feedback information; or receiving, by the transmit end device, a QoS null frame sent by the receive end device by using the main transceiver, where the QoS null frame includes a high efficiency aggregated control field, and the high efficiency aggregated control field carries the feedback information; or receiving, by the transmit end device, a beamforming report sent by the receive end device by using the main transceiver, where the beamforming report includes a feedback field, and the feedback field carries the feedback information.

With reference to the first aspect, or any one of the first to the tenth possible implementations of the first aspect, in an eleventh possible implementation of the first aspect, the sending, by the transmit end device, a second WUP to the wake-up receiver by using the second data rate includes: modulating, by the transmit end device, an information bit in the second WUP into a plurality of modulation symbols based on the second data rate, where the plurality of modulation symbols include a first modulation symbol whose symbol energy is 0 and a second modulation symbol whose symbol energy is not 0; and sending, by the transmit end device, the plurality of modulation symbols to the wake-up receiver.

With reference to the eleventh possible implementation of the first aspect, in a twelfth possible implementation of the first aspect, the sending, by the transmit end device, the plurality of modulation symbols to the wake-up receiver includes: sending, by the transmit end device, the plurality of modulation symbols to the wake-up receiver in a manner of sending one placeholder symbol to the wake-up receiver each time the transmit end device sends a first preset quantity of modulation symbols to the wake-up receiver, where the placeholder symbol does not carry an information bit, and a symbol energy of the placeholder symbol is not 0; or sending, by the transmit end device, the plurality of modulation symbols to the wake-up receiver in a manner of sending one placeholder symbol to the wake-up receiver each time the transmit end device sends a second preset quantity of first modulation symbols to the wake-up receiver, where the placeholder symbol does not carry an information bit, and a symbol energy of the placeholder symbol is not 0.

In this way, the following case may be avoided: Due to an excessively long channel idle time, another receive end device preempts a channel, affecting transmission of the wake-up packet. Therefore, efficiency of transmitting the wake-up packet is improved.

With reference to the first aspect or any one of the first to the twelfth possible implementations of the first aspect, in a thirteenth possible implementation of the first aspect, the second WUP includes a signaling field and a data field that are arranged in a sending time sequence, and the signaling field carries indication information used to indicate the second data rate.

With reference to the thirteenth possible implementation of the first aspect, in a fourteenth possible implementation of the first aspect, the second WUP further includes a redundancy field, and a sending time of the redundancy field is after a sending time of the signaling field and before a sending time of the data field.

In this way, the receive end device may adjust the data rate within a time period in which the transmit end device sends the redundancy field, to successfully receive and parse the data field sent by the transmit end device.

With reference to the first aspect or any one of the first to the twelfth possible implementations of the first aspect, in a fifteenth possible implementation of the first aspect, the second WUP includes a preamble field and a data field that are in a sending time sequence, so that the receive end device determines the second data rate based on a preamble mode corresponding to the preamble field and a preset correspondence, where the preset correspondence includes a correspondence between a preamble mode and a data rate.

With reference to the first aspect or any one of the first to the fifteenth possible implementations of the first aspect, in a sixteenth possible implementation of the first aspect, the second WUP includes a MAC header field, the MAC header field includes an identifier information field, the identifier information field is used to carry identifier information of the receive end device, and the method further includes: determining, by the transmit end device based on the second data rate, a quantity of information bits included in the identifier information field, where the quantity of information bits included in the identifier information field is positively correlated with a magnitude of the second data rate.

In this way, transmission overheads caused by excessive information bits included in the identifier information field can be avoided.

Optionally, the MAC header field includes a field used to indicate the quantity of information bits included in the identifier information field, so that the receive end device determines the quantity of information bits in the identifier information field based on information carried in the field.

According to a second aspect, a method for transmitting a wake-up packet in a communications system is provided. The communications system includes a transmit end device and a receive end device, the receive end device includes a wake-up receiver and a main transceiver, and the method includes: receiving, by the receive end device by using the wake-up receiver, a first wake-up packet WUP sent by the transmit end device by using a first data rate; receiving, by the receive end device by using the wake-up receiver, a second WUP sent by the transmit end device by using a second data rate; determining, by the receive end device, the second data rate; and parsing, by the receive end device, the second WUP based on the second data rate.

Therefore, according to the method for transmitting a wake-up packet in a communications system in this application, the receive end device receives wake-up packets sent by the transmit end device by using different data rates, and the transmit end device can determine, based on a specific transmission condition in a communication process, a proper data rate for sending a wake-up packet, thereby improving efficiency of transmitting the wake-up packet.

With reference to the second aspect, in a first possible implementation of the second aspect, the receiving, by the receive end device by using the wake-up receiver, a first wake-up packet WUP sent by the transmit end device by using a first data rate includes: receiving, by the receive end device by using the wake-up receiver, the first WUP sent by the transmit end device by using a first symbol rate; the receiving, by the receive end device by using the wake-up receiver, a second WUP sent by the transmit end device by using a second data rate includes: receiving, by the receive end device by using the wake-up receiver, the second WUP sent by the transmit end device by using a second symbol rate; the determining, by the receive end device, the second data rate includes: determining, by the receive end device, the second symbol rate; and the parsing, by the receive end device, the second WUP based on the second data rate includes: parsing, by the receive end device, the second WUP based on the second symbol rate.

With reference to the second aspect or the first possible implementation of the second aspect, in a second possible implementation of the second aspect, the receiving, by the receive end device by using the wake-up receiver, a first wake-up packet WUP sent by the transmit end device by using a first data rate includes: receiving, by the receive end device by using the wake-up receiver, the first WUP sent by the transmit end device by using a first modulation and coding scheme; the receiving, by the receive end device by using the wake-up receiver, a second WUP sent by the transmit end device by using a second data rate includes: receiving, by the receive end device by using the wake-up receiver, the second WUP sent by the transmit end device by using the second modulation and coding scheme; the determining, by the receive end device, the second data rate includes: determining, by the receive end device, the second modulation and coding scheme; and the parsing, by the receive end device, the second WUP based on the second data rate includes: parsing, by the receive end device, the second WUP based on the second modulation and coding scheme.

With reference to the second aspect, or either of the first or the second possible implementation of the second aspect, in a third possible implementation of the second aspect, the method further includes: sending, by the receive end device, feedback information to the transmit end device by using the main transceiver, so that the transmit end device determines the second data rate based on the feedback information.

With reference to the third possible implementation of the second aspect, in a fourth possible implementation of the second aspect, the feedback information includes first information used to indicate a signal-to-noise ratio on an operating frequency of the main transceiver and/or the wake-up receiver, so that the transmit end device determines the second data rate based on the first information and a correspondence between a signal-to-noise ratio and a data rate.

With reference to the third possible implementation of the second aspect, in a fifth possible implementation of the second aspect, the feedback information includes second information used to indicate a power of the first WUP when the first WUP arrives at the wake-up receiver, so that the transmit end device determines the second data rate based on the second information and a preset power threshold; or the feedback information includes third information used to indicate a signal-to-noise ratio of the first WUP at the wake-up receiver, so that the transmit end device determines the second data rate based on the third information and a preset signal-to-noise ratio threshold; or the feedback information includes fourth information used to indicate a packet error rate of the first WUP at the wake-up receiver, so that the transmit end device determines the second data rate based on the fourth information and a preset packet error rate threshold.

With reference to any one of the third to the fifth possible implementations of the second aspect, in a sixth possible implementation of the second aspect, the sending, by the receive end device, feedback information to the transmit end device by using the main transceiver includes: sending, by the receive end device, a medium access control MAC frame to the transmit end device by using the main transceiver, where the MAC frame carries the feedback information.

With reference to the sixth possible implementation of the second aspect, in a seventh possible implementation of the second aspect, the sending, by the receive end device, a medium access control MAC frame to the transmit end device by using the main transceiver includes: sending, by the receive end device, a quality of service QoS data frame to the transmit end device by using the main transceiver, where the QoS data frame includes a high throughput control field, and the high throughput control field carries the feedback information; or sending, by the receive end device, a QoS null frame to the transmit end device by using the main transceiver, where the QoS null frame includes a high efficiency aggregated control field, and the high efficiency aggregated control field carries the feedback information; or sending, by the receive end device, a beamforming report to the transmit end device by using the main transceiver, where the beamforming report includes a feedback field, and the feedback field carries the feedback information.

With reference to the second aspect or any one of the first to the seventh possible implementations of the second aspect, in an eighth possible implementation of the second aspect, the receiving, by the receive end device by using the wake-up receiver, a second WUP sent by the transmit end device by using a second data rate includes: receiving, by the receive end device by using the wake-up receiver, a plurality of modulation symbols sent by the transmit end device, where the plurality of modulation symbols are obtained by the transmit end device by modulating an information bit in the second WUP based on the second data rate, and the plurality of modulation symbols include a first modulation symbol whose symbol energy is 0 and a second modulation symbol whose symbol energy is not 0.

With reference to the eighth possible implementation of the second aspect, in a ninth possible implementation of the second aspect, the plurality of modulation symbols are sent by the transmit end device in a manner of sending one placeholder symbol to the wake-up receiver each time the transmit end device sends a first preset quantity of modulation symbols to the wake-up receiver, the placeholder symbol does not carry an information bit, and a symbol energy of the placeholder symbol is not 0; and the receiving, by the receive end device by using the wake-up receiver, a plurality of modulation symbols sent by the transmit end device includes: receiving, by the receive end device by using the wake-up receiver, the plurality of modulation symbols in a manner of ignoring the placeholder symbol each time the receive end device receives the first preset quantity of modulation symbols.

With reference to the eighth possible implementation of the second aspect, in a ninth possible implementation of the second aspect, the plurality of modulation symbols are sent by the transmit end device in a manner of sending one placeholder symbol to the wake-up receiver each time the transmit end device sends a second preset quantity of second modulation symbols to the wake-up receiver, the placeholder symbol does not carry an information bit, and a symbol energy of the placeholder symbol is not 0; and
the receiving, by the receive end device by using the wake-up receiver, a plurality of modulation symbols sent by the transmit end device includes: receiving, by the receive end device by using the wake-up receiver, the plurality of modulation symbols in a manner of ignoring the placeholder symbol each time the receive end device receives the second preset quantity of second modulation symbols.

With reference to the second aspect, or any one of the first to the ninth possible implementations of the second aspect, in a tenth possible implementation of the second aspect, the second WUP includes a signaling field and a data field that are arranged in a sending time sequence, and the signaling field carries indication information used to indicate the second data rate; and the determining, by the receive end device, the second data rate includes: determining, by the receive end device, the second data rate based on the indication information.

With reference to the tenth possible implementation of the second aspect, in an eleventh possible implementation of the second aspect, the second WUP further includes a redundancy field, and a sending time of the redundancy field is after a sending time of the signaling field and before a sending time of the data field.

With reference to the second aspect or any one of the first to the ninth possible implementations of the second aspect, in a twelfth possible implementation of the second aspect, the second WUP includes a preamble field and a data field that are in a sending time sequence; and the determining, by the receive end device, the second data rate includes: determining, by the receive end device, the second data rate based on a preamble mode corresponding to the preamble field and a preset correspondence, where the preset correspondence includes a correspondence between a preamble mode and a data rate.

With reference to the second aspect or any one of the first to the twelfth possible implementations of the second aspect, in a thirteenth possible implementation of the second aspect, the second WUP includes a MAC header field, the MAC header field includes an identifier information field, the identifier information field is used to carry identifier information of the receive end device, and a quantity of information bits included in the identifier information field is positively correlated with a magnitude of the second data rate.

According to a third aspect, a method for transmitting a wake-up packet in a communications system is provided. The communications system includes a transmit end device and a receive end device, the receive end device includes a wake-up receiver and a main transceiver, and the method includes: generating, by the transmit end device, M wake-up packets WUPs; and sending, by the transmit end device, an $i^{th}$ WUP to a wake-up receiver of an $i^{th}$ receive end device in M receive end devices, where transmission resources occupied by the transmit end device to send WUPs to wake-up receivers of any two receive end devices correspond to a same time and different frequencies, $i=1, 2, \ldots, M$, and M is a positive integer greater than 1.

Therefore, according to the method for transmitting a wake-up packet in a communications system in this embodiment of this application, the transmit end device simultaneously sends wake-up packets to a plurality of receive end devices, so that efficiency of transmitting the wake-up packet can be improved.

With reference to the third aspect, in a first possible implementation of the third aspect, the method further includes: generating, by the transmit end device, a plurality of symbols corresponding to an information bit in the $i^{th}$ WUP, where the plurality of symbols include a first symbol whose symbol energy is not 0 and a second symbol whose symbol energy is 0, and a method for generating the first symbol is: determining an $i^{th}$ frequency domain filling sequence; filling the $i^{th}$ frequency domain filling sequence on a plurality of subcarriers at an operating frequency of the wake-up receiver of the $i^{th}$ receive end device, to obtain an $i^{th}$ frequency domain signal; and performing an inverse fast Fourier transform IFFT on the $i^{th}$ frequency domain signal to obtain the symbol carrying an information bit 1.

With reference to the first possible implementation of the third aspect, in a second possible implementation of the third aspect, the determining an $i^{th}$ frequency domain filling sequence includes: twiddling a frequency domain pre-filling sequence based on an $i^{th}$ twiddle factor in M twiddle factors, to obtain the $i^{th}$ frequency domain filling sequence, where at least two twiddle factors in the M twiddle factors are different.

With reference to the first possible implementation of the third aspect, in a third possible implementation of the third aspect, the determining an $i^{th}$ frequency domain filling sequence includes: generating a full bandwidth sequence; and determining the $i^{th}$ filling sequence based on the full bandwidth sequence.

With reference to the first possible implementation of the third aspect, in a fourth possible implementation of the third aspect, a quantity of 0s between two neighboring non-zero values in the $i^{th}$ frequency domain filling sequence is a preset quantity.

With reference to the first possible implementation of the third aspect, in a fifth possible implementation of the third aspect, the determining an $i^{th}$ frequency domain filling sequence includes: generating an $i^{th}$ time domain filling sequence, where values in the $i^{th}$ time domain filling sequence have a same amplitude; and performing a Fourier transform FFT on the $i^{th}$ time domain filling sequence to obtain the $i^{th}$ frequency domain filling sequence.

According to a fourth aspect, a transmit end device is provided. The transmit end device is configured to perform the method in the first aspect or any possible implementation of the first aspect. Specifically, the transmit end device includes a function module configured to perform the method in the first aspect or any possible implementation of the first aspect.

According to a fifth aspect, a receive end device is provided. The receive end device is configured to perform the method in the second aspect or any possible implementation of the second aspect. Specifically, the receive end device includes a function module configured to perform the method in the second aspect or any possible implementation of the second aspect.

According to a sixth aspect, a transmit end device is provided. The transmit end device is configured to perform the method in the third aspect or any possible implementation of the third aspect. Specifically, the transmit end device includes a function module configured to perform the method in the third aspect or any possible implementation of the third aspect.

According to a seventh aspect, a transmit end device is provided. The transmit end device includes a processor, a memory, and a transceiver. The processor, the memory, and the transceiver are connected by using a bus system. The memory is configured to store an instruction. The processor is configured to invoke the instruction stored in the memory to control the transceiver to receive or send information, to enable the transmit end device to perform the method in the first aspect or any possible implementation of the first aspect.

According to an eighth aspect, a receive end device is provided. The receive end device includes a processor, a memory, a wake-up receiver, and a main transceiver. The processor, the memory, the wake-up receiver, and the main transceiver are connected by using a bus system. The memory is configured to store an instruction. The processor is configured to invoke the instruction stored in the memory to control the wake-up receiver to receive information and control the main transceiver to receive or send information, to enable the receive end device to perform the method in the second aspect or any possible implementation of the second aspect.

According to a ninth aspect, a transmit end device is provided. The transmit end device includes a processor, a memory, and a transceiver. The processor, the memory, and the transceiver are connected by using a bus system. The memory is configured to store an instruction. The processor is configured to invoke the instruction stored in the memory to control the transceiver to receive or send information, to enable the transmit end device to perform the method in the third aspect or any possible implementation of the third aspect.

According to a tenth aspect, a computer readable medium is provided. The computer readable medium is configured to store a computer program. The computer program includes an instruction used to perform the method in the first aspect or any possible implementation of the first aspect.

According to an eleventh aspect, a computer readable medium is provided. The computer readable medium is configured to store a computer program. The computer program includes an instruction used to perform the method in the second aspect or any possible implementation of the second aspect.

According to a twelfth aspect, a computer readable medium is provided. The computer readable medium is configured to store a computer program. The computer program includes an instruction used to perform the method in the third aspect or any possible implementation of the third aspect.

DESCRIPTION OF DRAWINGS

FIG. 7 is a schematic structural diagram of a QoS data frame according to an embodiment of this application;

FIG. 15 is a schematic diagram of a method for distinguishing between receive end devices according to an embodiment of this application;

FIG. 16 is a schematic diagram of a method in which a transmit end device simultaneously sends wake-up packets to a plurality of receive ends according to an embodiment of this application;

FIG. 17 is a schematic block diagram of a transmit end device according to an embodiment of this application;

DESCRIPTION OF EMBODIMENTS

Figure 1:
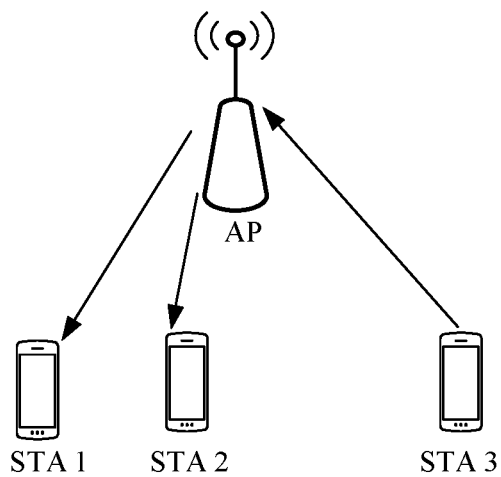
FIG. 1 is a schematic diagram of an application scenario according to an embodiment of this application.

FIG. 1 is a schematic diagram of an application scenario according to an embodiment of this application. A wireless local area network (Wireless Local Area Network, WLAN) shown in FIG. 1 includes a transmit end device (for example, an access point (Access Point, AP) shown in FIG. 1) and a receive end device (for example, a station (Station, STA) shown in FIG. 1). The AP is responsible for performing bidirectional communication with a plurality of STAs. For example, the AP shown in FIG. 1 sends downlink data to the STA (for example, a STA 1 and a STA 2 in FIG. 1), or the AP receives uplink data from the STA (for example, a STA 3 in FIG. 1). It should be understood that, a quantity of APs and a quantity of STAs shown in FIG. 1 are only examples, and the WLAN may include any quantity of APs and any quantity of STAs.

Figure 2:
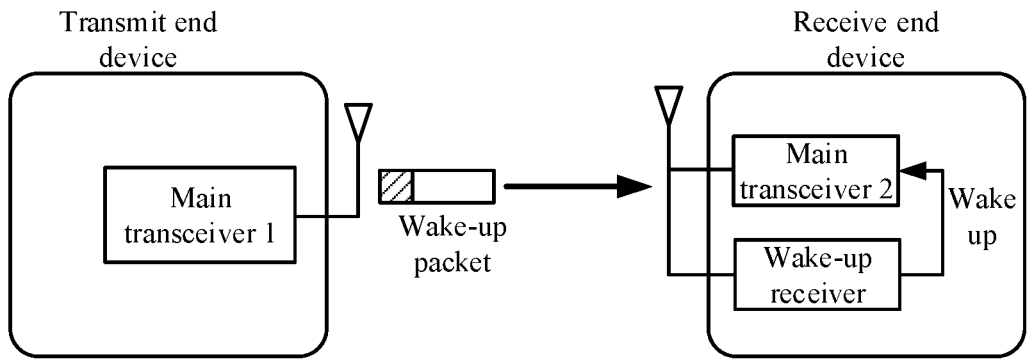
FIG. 2 is a schematic diagram of a possible collaborative operating manner of a wake-up receiver and a main transceiver according to an embodiment of this application.

FIG. 2 is a schematic diagram of a possible collaborative operating manner of a wake-up receiver and a main transceiver according to an embodiment of this application. As shown in FIG. 2, a receive end device includes a main transceiver 2 and a wake-up receiver, and a transmit end device includes a main transceiver 1. To implement low power consumption, a circuit structure of the wake-up receiver is relatively simple, and may include only an energy detection (Energy Detect) part and a radio frequency (Radio Frequency, RF) part. After the main transceiver 2 of the receive end device enters deep sleep, the wake-up receiver with low power consumption wakes up and starts operating. If the transmit end device needs to communicate with the receive end device, the transmit end device first sends a wake-up packet (Wake Up Packet, WUP) to the wake-up receiver of the receive end device. After correctly receiving the WUP sent to the wake-up receiver, the wake-up receiver wakes up the main transceiver 2 of the receive end device, and then enters a sleep state; and the transmit end device communicates with the main transceiver 2 by using the main transceiver 1. After completing communication with the transmit end device, the main transceiver 2 enters the sleep state, and the wake-up receiver wakes up and starts listening for whether there is a WUP sent to the wake-up receiver, so as to wake up the main transceiver 2 when receiving the WUP.

It should be understood that, a main transceiver of a receive end device can be woken up only by a wake-up receiver corresponding to the receive end device. When no special description is provided in this specification, the main transceiver and the wake-up receiver are respectively a main transceiver and a wake-up receiver of a same receive end device. When the receive end device is a STA, a corresponding transmit end device is an AP; or when the receive end device is an AP, a corresponding receive end device is a STA.

Figure 3:
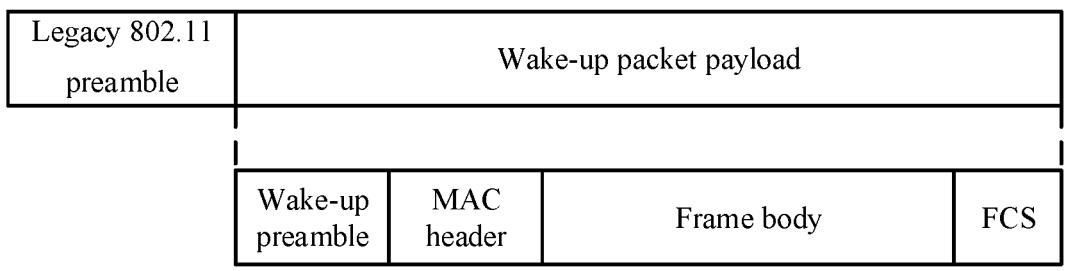
FIG. 3 is a schematic structural diagram of a wake-up packet according to an embodiment of this application.

It should be further understood that the WUP mentioned in this embodiment of this application may also be referred to as a wake-up frame (Wake Up Frame). FIG. 3 shows a possible structure of a WUP according to an embodiment of this application. The WUP includes a legacy 802.11 preamble (Legacy 802.11 Preamble) and a WUP payload (Payload). The WUP payload includes a wake-up preamble (Wake Up Preamble), a medium access control header (Medium Access Control Header, MAC Header), a frame body (Frame Body), and a frame check sequence (Frame Check Sequence, FCS). The WUP payload may also be referred to as a data part (Data Part).

The legacy 802.11 preamble is used to protect a subsequent part of the WUP from being interfered by a legacy 802.11 device, a function of the wake-up preamble is used by a receive end device to identify a WUP signal, the MAC header part may carry information such as an address of the receive end device and that of a transmit end device, the frame body is used to carry some other information, and the FCS part is used to ensure that data received by the receive end device is the same as data sent by the transmit end device.

With reference to specific embodiments, the following describes a method for transmitting a wake-up packet in a communications system according to an embodiment of this application. It should be noted that, in the following embodiments, a data rate refers to an amount of information (a quantity of bits) transmitted on a channel within a unit time, and a symbol rate refers to a quantity of symbols transmitted on a channel within a unit time. That a transmit end device sends a wake-up packet to a wake-up receiver of a receive end device may alternatively be described as that the transmit end device sends the wake-up packet to the receive end device.

Figure 4:
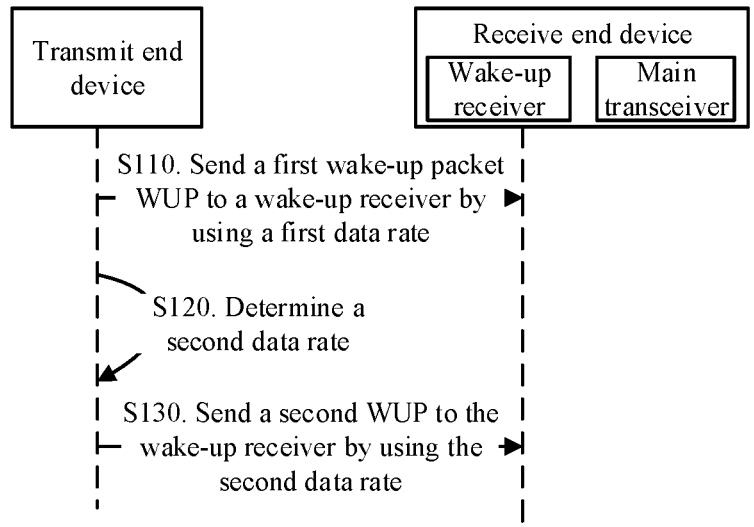
FIG. 4 is a schematic flowchart of a method for transmitting a wake-up packet in a communications system according to an embodiment of this application.

FIG. 4 is a schematic flowchart of a method for transmitting a wake-up packet in a communications system according to an embodiment of this application. The communications system includes a transmit end device and a receive end device, and the receive end device includes a wake-up receiver and a main transceiver. As shown in FIG. 4, a method 100 includes:

S110. The transmit end device sends a first wake-up packet WUP to the wake-up receiver by using a first data rate.

S120. The transmit end device determines a second data rate.

S130. The transmit end device sends a second WUP to the wake-up receiver by using the second data rate.

Optionally, in an example, in S110, a possible implementation in which the transmit end device sends the first WUP to the wake-up receiver by using the first data rate is as follows: The transmit end device sends the first WUP to the wake-up receiver by using a first symbol rate. Correspondingly, in S120, the transmit end device determines a second symbol rate; and in S130, the transmit end device sends the second WUP to the wake-up receiver by using the second symbol rate.

To be specific, a specific implementation in which the transmit end device sends a WUP to the wake-up receiver of the receive end device by using a variable data rate is as follows: The transmit end device sends the WUP to the wake-up receiver of the receive end device by using a variable symbol rate.

It may be understood that the variable symbol rate may be specifically embodied as a variable symbol length, for example, t1, t2, or t3.

Figure 5:
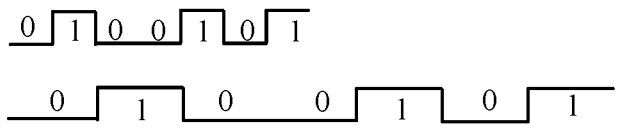
FIG. 5 is a schematic diagram of two different symbol lengths according to an embodiment of this application.

In the foregoing embodiment, a manner of generating a variable symbol length is: defining a minimum symbol length as t µs, and determining other symbol lengths based on t. For example, t1=t, t2=2t, t3=3t, and the like may be defined. FIG. 5 is a schematic diagram of two different symbol lengths according to an embodiment of this application. Optionally, a value of t may be specified as one of the following values: 1.6 µs, 2 µs, 2.4 µs, 3.2 µs, and 4 µs. Alternatively, the minimum symbol length is defined as t µs, and symbols of a plurality of lengths are generated by using different spreading codes. Specifically, a plurality of spreading codes whose lengths are 1, 2, 4, 8, and the like may be defined, and different symbol lengths correspond to different spreading codes. For example, when an information bit is 1, if a length of a spreading code is 1, a symbol used to carry the information bit 1 includes one symbol whose length is t µs; or if a length of a spreading code is 4, a symbol used to carry the information bit 1 includes four symbols whose lengths are t µs.

In this embodiment of this application, optionally, before each sending of the WUP, the transmit end device needs to determine a symbol length, and the symbol length determined by the transmit end device needs to meet the following condition: A power of the WUP when the WUP arrives at the receive end device is not less than a preset power threshold (or an average power of symbols in the WUP when the symbols arrive at the receive end device is not less than a preset power threshold), or a packet error rate (Packet Error Rate, PER) of demodulation of the WUP at the receive end device is less than a preset packet error rate threshold (or an average symbol error rate of symbols in the WUP at the receive end device is less than a preset symbol error rate threshold), or a signal-to-noise ratio of the WUP at the receive end device is not less than a preset signal-to-noise ratio threshold (or an average signal-to-noise ratio of symbols in the WUP at the receive end device is not less than a preset signal-to-noise ratio threshold). It is assumed that a symbol length meeting the foregoing condition is T1. In this case, the transmit end device determines that a symbol length T used for sending the WUP this time is greater than or equal to T1.

Further, the transmit end device determines the symbol length based on a multipath delay spread, so that the symbol length determined by the transmit end device is not less than a multipath delay spread in a short range (an indoor environment), or not less than a multipath delay spread in a long range (an outdoor environment), or not less than a multipath delay spread in a current communication environment. It is assumed that a symbol length meeting the foregoing constraint condition is T2. The transmit end device may determine a value greater than or equal to a maximum value in T1 and T2 as a symbol length T used for sending the WUP this time. Alternatively, the symbol length T determined by the transmit end device meets $T_1+T_2 \geq T \geq T_1$ or $T_1+T_2 \geq T \geq \max(T_1, T_2)$. After receiving each symbol, the corresponding receive end device discards symbols received in previous x µs or T2 µs to avoid interference between symbols.

In the foregoing embodiment, optionally, the transmit end device may multiplex an OFDM transmitter. When the symbol length is less than a symbol length in an existing standard, a symbol output by an inverse fast Fourier transform (Inverse fast Fourier transform, IFFT) module may be truncated by using an existing truncation (Truncate) module in the OFDM transmitter, or the symbol output by the IFFT module may be extracted by using a down-sampling module, or a shorter symbol may be generated by directly using a smaller-point IFFT. However, this application is not limited thereto.

Optionally, in another example, in S110, a possible implementation in which the transmit end device sends the first WUP to the wake-up receiver by using the first data rate is as follows: The transmit end device sends the first WUP to the wake-up receiver by using a first modulation and coding scheme. Correspondingly, in S120, the transmit end device determines a second modulation and coding scheme; and in S130, the transmit end device sends the second WUP to the wake-up receiver by using the second modulation and coding scheme.

To be specific, a specific implementation in which the transmit end device sends a WUP to the wake-up receiver of the receive end device by using a variable data rate is as follows: The transmit end device sends the WUP to the wake-up receiver of the receive end device by using a variable modulation and coding scheme.

It may be understood that variable coding and modulation may be specifically embodied as a variable frequency modulation order and/or a variable phase modulation order and/or a variable amplitude modulation order and/or a variable coding rate. For example, the variable frequency modulation order and/or the variable phase modulation order and/or the variable amplitude modulation order are/is binary amplitude shift keying (Amplitude-shift-keying, ASK) or 4ASK; or binary frequency shift keying (Frequency-shift-keying, FSK) FSK or 4FSK; or binary phase shift keying (Phase-shift-keying, PSK) or 4PSK; or quaternary quadrature amplitude modulation (Quadrature Amplitude Modulation, QAM) or 16QAM. For example, the variable coding rate is ½ BCC coding, ¾ BCC coding, or coding with the variable coding rate.

In this embodiment of this application, optionally, before each sending of the WUP, the transmit end device needs to determine a modulation and coding scheme, and the modulation and coding scheme determined by the transmit end device needs to meet the following condition: A power of the WUP when the WUP arrives at the receive end device is not less than a preset power threshold (or an average power of symbols in the WUP when the symbols arrive at the receive end device is not less than a preset power threshold), or a packet error rate (Packet Error Rate, PER) of demodulation of the WUP at the receive end device is less than a preset packet error rate threshold (or an average symbol error rate of symbols in the WUP at the receive end device is less than a preset symbol error rate threshold), or a signal-to-noise ratio of the WUP at the receive end device is not less than a preset signal-to-noise ratio threshold (or an average signal-to-noise ratio of symbols in the WUP at the receive end device is not less than a preset signal-to-noise ratio threshold).

Optionally, in another example, in S110, a possible implementation in which the transmit end device sends the first WUP to the wake-up receiver by using the first data rate is as follows: The transmit end device sends the first WUP to the wake-up receiver by using a first symbol rate and a first modulation and coding scheme. Correspondingly, in S120, the transmit end device determines a second symbol rate and a second modulation and coding scheme; and in S130, the transmit end device sends the second WUP to the wake-up receiver by using the second symbol rate and the second modulation and coding scheme.

To be specific, a specific implementation in which the transmit end device sends a WUP to the wake-up receiver of the receive end device by using a variable data rate is as follows: The transmit end device sends the WUP to the wake-up receiver of the receive end device by using a variable symbol rate and a variable modulation and coding scheme.

The variable symbol rate and the variable modulation and coding scheme may be specifically embodied as a variable symbol length+a variable frequency modulation order and/or a variable phase modulation order and/or a variable amplitude modulation order and/or a coding rate, for example, t1+2ASK, t2+2ASK, or t2+4ASK. A specific example is as follows: 4 µs+amplitude 0 indicates 0, and 4 µs+amplitude A indicates 1; 4 µs+amplitude 0 indicates 00, 4 µs+amplitude A indicates 01, 4 µs+amplitude 2 A indicates 10, and 4 µs+amplitude 3 A indicates 11; 2.4 µs+amplitude 0 indicates 0, and 2.4 µs+amplitude A indicates 1; and 2.4 µs+amplitude 0 indicates 00, 2.4 µs+amplitude A indicates 01, 2.4 µs+amplitude 2 A indicates 10, and 2.4 µs+amplitude 3 A indicates 11.

In this embodiment of this application, optionally, before each sending of the WUP, the transmit end device needs to determine a symbol length and a modulation and coding scheme, and the symbol length and the modulation and coding scheme determined by the transmit end device need to meet the following condition: A power of the WUP when the WUP arrives at the receive end device is not less than a preset power threshold (or an average power of symbols in the WUP when the symbols arrive at the receive end device is not less than a preset power threshold), or a packet error rate (Packet Error Rate, PER) of demodulation of the WUP at the receive end device is less than a preset packet error rate threshold (or an average symbol error rate of symbols in the WUP at the receive end device is less than a preset symbol error rate threshold), or a signal-to-noise ratio of the WUP at the receive end device is not less than a preset signal-to-noise ratio threshold (or an average signal-to-noise ratio of symbols in the WUP at the receive end device is not less than a preset signal-to-noise ratio threshold).

In the foregoing embodiment, optionally, the transmit end device may multiplex an OFDM transmitter. When the symbol length is less than a symbol length in an existing standard, a symbol output by an inverse fast Fourier transform (Inverse fast Fourier transform, IFFT) module may be truncated by using an existing truncation (Truncate) module in the OFDM transmitter, or the symbol output by the IFFT module may be extracted by using a down-sampling module, or a shorter symbol may be generated by directly using a smaller-point IFFT. However, this application is not limited thereto.

Optionally, in an embodiment, in S120, when determining the second data rate, the transmit end device determines the second data rate based on a data rate used when the transmit end device sends data to the main transceiver. For example, the transmit end device sends data to the main transceiver by using the first data rate. If the transmit end device determines that the receive end device can correctly receive the data, the transmit end device considers that current channel quality is relatively good, and may further increase the data rate used when the transmit end device sends the data. Therefore, when sending the second WUP, the transmit end device may send the wake-up packet to the wake-up receiver by using a second data rate greater than the first data rate. Alternatively, the transmit end device sends data to the main transceiver by using the first data rate. If the transmit end device determines that the receive end device cannot correctly receive the data, the transmit end device considers that current channel quality is relatively poor, and needs to further decrease the data rate used when the transmit end device sends the data. Therefore, when sending the second WUP, the transmit end device may send the WUP to the wake-up receiver by using a second data rate smaller than the first data rate.

Optionally, in another embodiment, in S120, when determining the second data rate, the transmit end device determines the second data rate based on an operating frequency band of the main transceiver and/or an operating frequency band of the wake-up receiver. For example, if the main transceiver operates on a 2.4 GHz frequency band and the wake-up receiver operates on a 5 GHz frequency band, the transmit end device sends the wake-up packet to the wake-up receiver at the first data rate. If the main transceiver operates on a 5 GHz frequency band and the wake-up receiver operates on a 2.4 GHz frequency band, the transmit end device sends the wake-up packet to the wake-up receiver at the second data rate. Alternatively, if the main transceiver and the wake-up receiver operate on a same frequency band, the transmit end device sends the wake-up packet to the wake-up receiver at the first data rate. If the main transceiver and the wake-up receiver operate on different frequency bands, the transmit end device sends the wake-up packet to the wake-up receiver at the second data rate.

Figure 6:
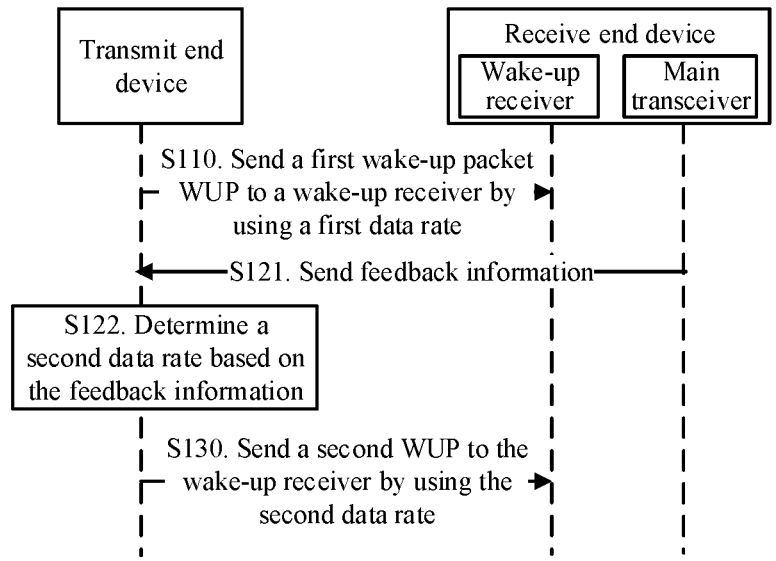
FIG. 6 is another schematic flowchart of a method for transmitting a wake-up packet in a communications system according to an embodiment of this application.

Optionally, in another embodiment, as shown in FIG. 6, S120 specifically includes the following steps.

S121. The transmit end device receives feedback information sent by the receive end device by using the main transceiver.

S122. The transmit end device determines the second data rate based on the feedback information.

Optionally, in S121, the feedback information includes a data rate that the receive end device expects the transmit end device to use, and the transmit end device may directly determine the data rate in the feedback information as the second data rate.

Optionally, in S121, the feedback information includes first information used to indicate a signal-to-noise ratio (signal-to-noise ratio, SNR) on an operating frequency of the main transceiver and/or an operating frequency of the wake-up receiver. Correspondingly, in S122, the transmit end device determines the second data rate based on the first information and a correspondence between a signal-to-noise ratio and a data rate.

Optionally, the correspondence between a signal-to-noise ratio and a data rate may be stored in the transmit end device in a form of a table. For example, if capabilities of all wake-up receivers are considered as the same, for example, all the wake-up receivers have a channel coding capability, or none of the wake-up receivers has a channel coding capability, a possible correspondence between an SNR and a data rate may be shown in Table 1.

TABLE 1

| SNR Range | Data Rate |
| --- | --- |
| <snr_1 dB | Rate 1 |
| snr_1 dB to snr_2 dB | Rate 2 |
| snr_2 dB to snr_3 dB | Rate 3 |
| >snr_3 dB | Rate 4 |

If differences of the capabilities of the wake-up receivers are considered, for example, some wake-up receivers have the channel coding capability, and the other wake-up receivers do not have the channel coding capability, in this case, when performing energy reporting, the receive end device needs to report whether the wake-up receiver of the receive end device supports channel coding. When being associated with the transmit end device, the receive end device may report whether the wake-up receiver of the receive end device supports channel coding; or in a process of communicating with the transmit end device by using the main transceiver, the receive end device may inform the transmit end device whether the wake-up receiver of the receive end device supports channel coding. A possible correspondence between an SNR and a data rate is shown in Table 2.

TABLE 2

| SNR Range | Data Rate | |
| --- | --- | --- |
| | Having a channel coding capability | Having no channel coding capability |
| <snr_1 dB | Rate 1 | Rate 1' |
| snr_1 dB to snr_2 dB | Rate 2 | Rate 2' |
| snr_2 dB to snr_3 dB | Rate 3 | Rate 3' |
| >snr_3 dB | Rate 4 | Rate 4' |

Alternatively, a correspondence table between an SNR and a data rate may be separately set for a wake-up receiver having a channel coding capability and a wake-up receiver having no channel coding capability. A correspondence that is between an SNR and a data rate and that corresponds to a wake-up receiver having a channel coding capability is shown in Table 1. A correspondence that is between an SNR and a data rate and that corresponds to a wake-up receiver having no channel coding capability is shown in Table 3.

TABLE 3

| SNR Range | Data Rate |
| --- | --- |
| <snr_1 dB | Rate 1' |
| snr_1 dB to snr_2 dB | Rate 2' |
| snr_2 dB to snr_3 dB | Rate 3' |
| >snr_3 dB | Rate 4' |

Further, a group of modulation and coding schemes (Modulation and Coding Scheme, MCS) may be specified for the wake-up receiver, and a correspondence exists between a data rate and a modulation and coding scheme. A possible correspondence between a data rate and a modulation and coding scheme is shown in Table 4.

TABLE 4

| MCS | Scheme |
| --- | --- |
| 0 | Rate 1 |
| 1 | Rate 2 |
| 2 | Rate 3 |
| 3 | Rate 4 |
| 4 | Rate 1 + channel coding |
| 5 | Rate 2 + channel coding |
| 6 | Rate 3 + channel coding |
| 7 | Rate 4 + channel coding |

Optionally, only MCSs 0 to 3 may be specified. For a wake-up receiver having no channel coding capability, it is considered that a current MCS corresponds to Rate 1 to Rate 4; and for a wake-up receiver having a channel coding capability, it is considered that a current MCS corresponds to Rate 1+channel coding to Rate 4+channel coding.

Optionally, a rate in Table 1 to Table 3 may be replaced with an MCS scheme.

It may be understood that the data rate in the foregoing tables may be specifically in a form of a variable symbol length, or in a form of a variable symbol length+a variable frequency modulation order and/or a variable phase modulation order and/or a variable amplitude modulation order.

Optionally, in S121, the feedback information includes second information used to indicate a power of the first WUP when the first WUP arrives at the wake-up receiver. Correspondingly, S122 is specifically as follows: The transmit end device determines the second data rate based on the second information and a preset power threshold.

Alternatively, in S121, the feedback information includes third information used to indicate a signal-to-noise ratio of the first WUP at the wake-up receiver. Correspondingly, S122 is specifically as follows: The transmit end device determines the second data rate based on the third information and a preset signal-to-noise ratio threshold.

Alternatively, in S121, the feedback information includes fourth information used to indicate a packet error rate of the first WUP at the wake-up receiver. Correspondingly, S122 is specifically as follows: The transmit end device determines the second data rate based on the fourth information and a preset packet error rate threshold.

Optionally, in an embodiment, a specific implementation in which the receive end device sends the feedback information to the transmit end device by using the main transceiver is as follows: The receive end device sends a medium access control (Medium Access Control, MAC) frame to the transmit end device by using the main transceiver, where the MAC frame carries the feedback information.

Specifically, the MAC frame is a quality of service (Quality of Service, QoS) data (Data) frame. FIG. 7 shows a frame structure of a QoS data frame according to an embodiment of this application. As shown in FIG. 7, the QoS data frame includes a frame control (Frame Control) field, a duration/identifier (Duration/ID) field, an address (Address) 1 field, an address 2 field, an address 3 field, a sequence control (Sequence Control) field, an address 4 field, a quality of service control (QoS Control) field, a high throughput control (HT Control) field, a frame body (Frame Body) field, and a frame check sequence FCS field. The HT control field carries the feedback information.

Figure 8:
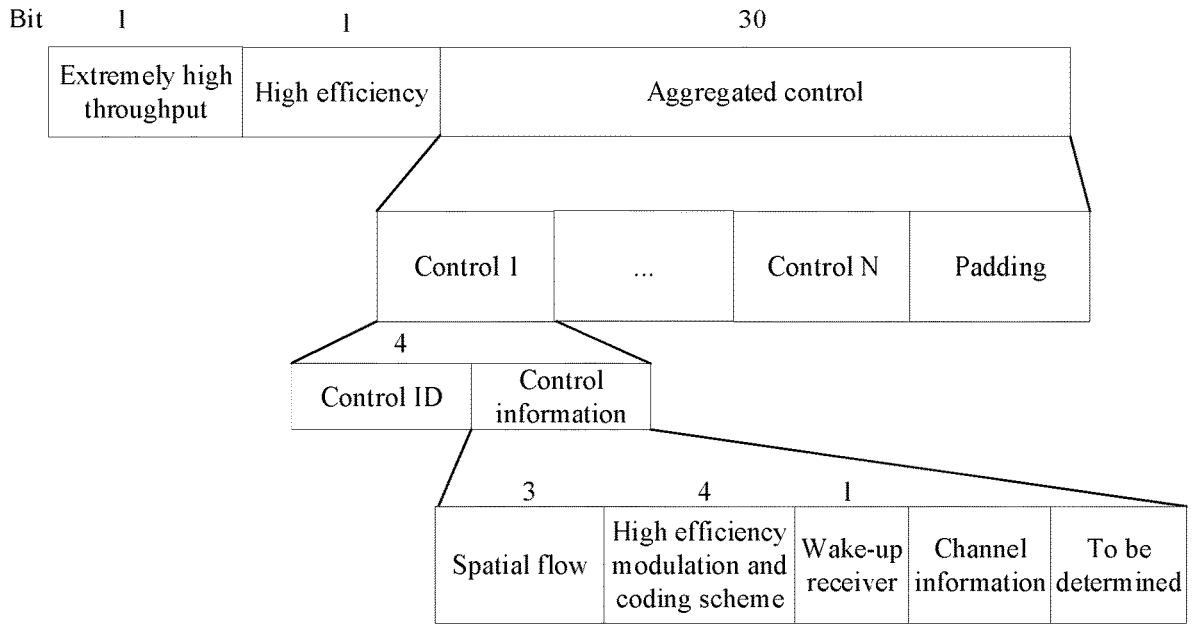
FIG. 8 is a schematic structural diagram of a high efficiency aggregated control field according to an embodiment of this application.

Alternatively, the MAC frame is a QoS null (Null) frame, and the QoS null frame includes a high efficiency aggregated control (High EfficiencyAggregated Control, HE-A-Control) field. FIG. 8 shows a structure of a high efficiency aggregated control field according to an embodiment of this application. As shown in FIG. 8, the HE-A-Control field includes an extremely high throughput field, a high efficiency field, and an aggregated control (Aggregated Control) field. The aggregated control field includes a plurality of control (control 1 to control N) fields and a padding (Padding) field. Each control field includes a control identifier field and a control information (Control Info) field. The control information field includes a number of spatial flows (Number of Spatial Stream, NSS) field, an HE-MCS field, a wake-up receiver field, a channel information field, and a reserved field. The wake-up receiver field carries the feedback information.

In an actual communication process, a function of each control field is determined by changing a value indicated by the control identifier field. For example, when the control identifier field indicates 2, it indicates that information in the control field is used for link adaptation, and feedback of a channel quality indication (Channel Quality Indication, CQI), an MCS, and the like. In addition, whether the feedback information is applied to rate adjustment of the wake-up receiver or link adaptation of a main radio is determined based on an indication of the wake-up receiver field. For example, if the wake-up receiver field indicates "1", it indicates that the feedback information is applied to the rate adjustment of the wake-up receiver; or if the wake-up receiver field indicates "0", it indicates that the feedback information is applied to the link adaptation of the main radio.

Further, the control information field may further carry channel information, to indicate that the feedback information is information used for which channel/resource block. Further, rate information on a plurality of channels/resource blocks may be fed back. A new control identifier field may be further added, and the new control identifier field carries the feedback information.

Figure 9:
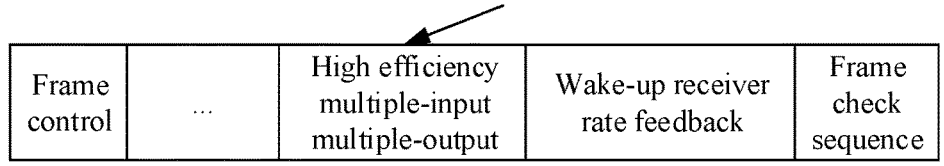
FIG. 9 is a schematic structural diagram of a beamforming report according to an embodiment of this application.

Optionally, the MAC frame is a beamforming report (Beamforming Report). FIG. 9 is a structural diagram of a beamforming report according to an embodiment of this application. As shown in FIG. 9, the beamforming report includes a frame control field, a high efficiency multiple-input multiple-output (Multiple Input Multiple Output, MIMO) control field, a wake-up receiver rate feedback field, and a frame check sequence field. The wake-up receiver rate feedback field is used to carry the feedback information. A reserved bit of the high efficiency MIMO control field is used to indicate that the beamforming report is used to carry the feedback information.

It should be noted that the MAC frame in this embodiment of this application is not limited to the several types of MAC frames listed above, and may alternatively be another type of MAC frame, for example, a newly defined MAC frame in a standard, or a newly defined action no ACK frame (an action frame that does not need an acknowledgment).

Figure 10:
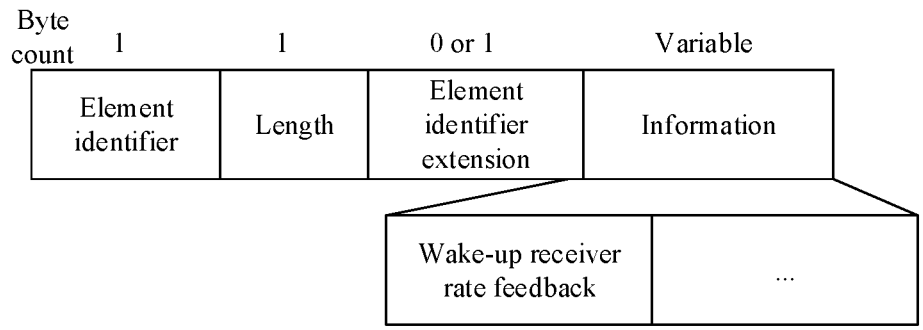
FIG. 10 is a schematic structural diagram of an information element according to an embodiment of this application.

Optionally, in an embodiment, the transmit end device carries the feedback information by using an information element (Information Element). FIG. 10 is a structural diagram of an information element according to an embodiment of this application. As shown in FIG. 10, the information element includes an element identifier (Element Identifier) field, a length (Length) field, an element identifier extension (Element Identifier Extension) field, and an information (Information) field. The information field includes a wake-up receiver rate feedback field, and the wake-up receiver rate feedback field carries the feedback information. In an actual communication process, different element identifier fields may be used to indicate that the information field carries different management information. The information element may be carried in a management frame. The management frame may be an action no ACK frame, an ACK frame, or a beacon frame. However, this application is not limited thereto.

In the foregoing embodiment, a form for feeding back the data rate by using the feedback information may be separately indicating a data rate on each channel/resource block, or may be first indicating some common information and then indicating information of each resource block.

Further, for downlink feedback, rates on a plurality of point-to-point channels between a station STA and an access point AP may be fed back; and rates on a plurality of channels between an AP and a plurality of STAs may be further fed back. In addition, the data rate may be carried by using a multiple-STA block acknowledgement (Multiple-STA Block Acknowledgement, M-BA) frame or a trigger (Trigger) frame.

Figure 11:
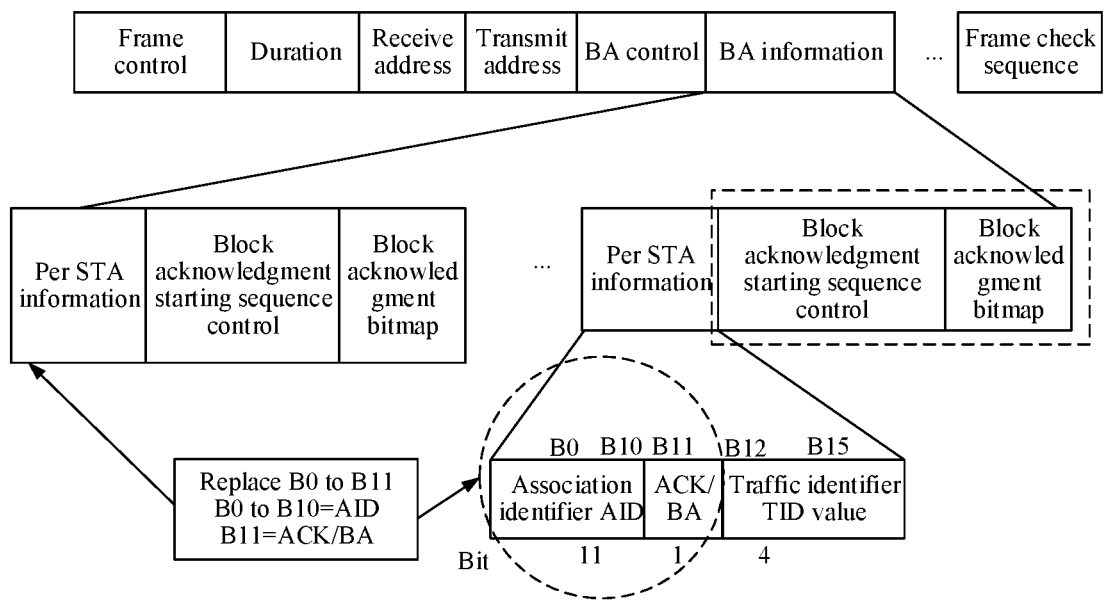
FIG. 11 is a schematic structural diagram of an M-BA frame according to an embodiment of this application.

For example, FIG. 11 shows a structure of an M-BA frame according to an embodiment of this application. As shown in FIG. 11, the M-BA frame includes a frame control field, a duration (Duration) field, a receive address (Receive Address, "RA" for short) field, and a transmit address (Transmit Address, TA) field, a BA control field, a BA information field, and an FCS field. The BA information field includes a repeated per STA information (Per STA Info) field, a block acknowledgment starting sequence control (Block ACK Starting Sequence Control) field, and a block acknowledgment bitmap (Block ACK Bitmap) field. The per STA information field includes an association identifier (Association Identifier, AID) field, an ACK/BA field, and a traffic identifier (Traffic Identifier, TID) value (Value) field. A special TID/AID value may be used to indicate that the block ACK starting sequence control field and the block ACK bitmap field are used to carry the data rate of the wake-up receiver.

Figure 12:
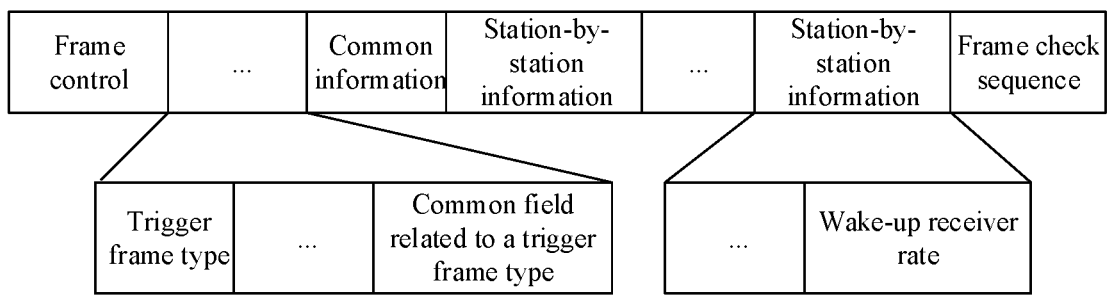
FIG. 12 is a schematic structural diagram of a trigger frame according to an embodiment of this application.

FIG. 12 shows a structure of a trigger frame according to an embodiment of this application. As shown in FIG. 12, the trigger frame includes a frame control field, a trigger frame type field, a common field related to a trigger frame type, a common information field, a station-by-station information field, and an FCS field. The common field related to the trigger frame type is used to carry the data rate. Alternatively, as shown in FIG. 12, the station-by-station information field includes a wake-up receiver rate field that is used to carry the data rate.

It should be noted that, the method in which the AP feeds back the data rate to a plurality of STAs is also applicable to a process in which the STA feeds back a data rate to the AP. The method is not only applicable to a process in which the STA feeds back data rates for wake-up packets on a plurality of channels/resource blocks to one AP, and is also applicable to a process in which the STA feeds back data rates for wake-up packets on a plurality of channels/resource blocks to a plurality of APs or STAs.

Figure 13:
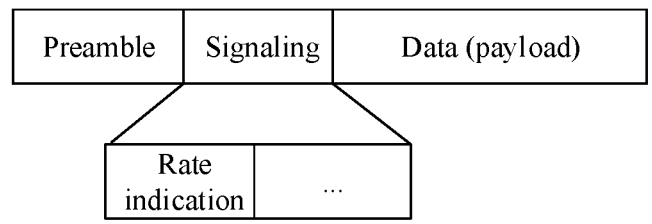
FIG. 13 is a schematic structural diagram of a wake-up packet according to another embodiment of this application.

In this embodiment of this application, optionally, the transmit end device may indicate, to the receive end device, a data rate used when the transmit end device transmits the wake-up packet, so that the receive end device receives and parses the received wake-up packet based on the data rate. FIG. 13 is a schematic structural diagram of a wake-up packet according to another embodiment of this application. As shown in FIG. 13, the wake-up packet includes a preamble field, a signaling (Signaling, SIG) field, and a data (payload) field. The preamble field is used by the receive end device to perform automatic gain control (Automatic Gain Control, ACG) and time synchronization. The signaling field includes a rate indication field. The rate indication field is used to indicate the second data rate. The signaling field may further include a field used to carry other information used for parsing data. This is not limited in this application.

Figure 14:
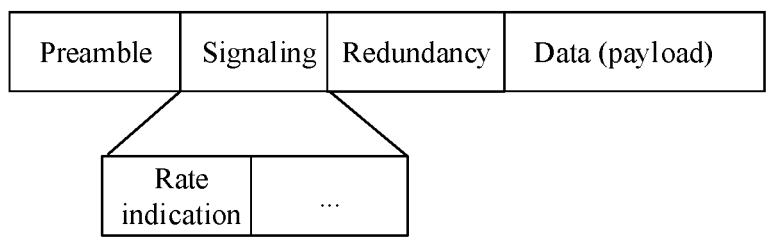
FIG. 14 is a schematic structural diagram of a wake-up packet according to still another embodiment of this application.

Further, after the wake-up receiver of the receive end device receives the wake-up packet, the data rate cannot be adjusted immediately. As shown in FIG. 14, a redundancy field is added after the SIG field (after the rate indication field if the SIG field includes only the rate indication field), where the redundancy field may include N symbols, and N is a positive integer greater than or equal to 1, so that the wake-up receiver adjusts the data rate.

Optionally, in an embodiment, M symbols of a fixed data rate (symbol length and/or MCS) may be placed after the SIG field, where a value of M may be 1, 2, or the like, so that the receive end device performs channel estimation based on the M symbols of the fixed data rate.

Optionally, in an embodiment, the receive end device may determine the second data rate based on a correspondence between a preamble mode and a data rate. For example, the correspondence between a preamble mode and a data rate may be preset. After determining a preamble mode, the receive end device may determine a current data rate based on the determined preamble mode and the correspondence.

For example, if the preamble mode is 10101010, it is considered that a data rate of a subsequent data part is a rate 1; or if the preamble mode is 110011001100, it is considered that a data rate of a subsequent data part is a rate 2. Alternatively, if an additional sequence is further included in the preamble field after the field that carries the information used by the receive end device to perform time synchronization or AGC, the receive end device may determine the data rate based on the additional sequence. For example, if the preamble field is "time synchronization/AGC" codeword+sequence 1, the receive end device determines that the data rate is a rate 1; or if the preamble field is "time synchronization/AGC+sequence 2", the receive end device determines that the data rate is a rate 2.

Optionally, in an embodiment, the receive end device may determine the data rate of the wake-up packet by using a data rate used by the main transceiver. Specifically, a correspondence exists between a data rate of a wake-up packet and a data rate of a main transceiver. For example, if the main transceiver uses MCSs 0 to 2, a rate 1 is used for the wake-up packet; or if the main transceiver uses MCSs 3 to 5, a rate 2 is used for the wake-up packet.

Optionally, in an embodiment, the receive end device may determine the data rate of the wake-up packet by using an operating frequency band of the main transceiver and/or an operating frequency band of the wake-up radio. For example, when the main transceiver and the wake-up receiver are on a same operating frequency band (both on 2.4 GHz or both on 5 GHz), a rate 1 is used for the wake-up packet; when the main transceiver and the wake-up receiver are on different operating frequency bands (the main transceiver is on 2.4 GHz and the wake-up radio is on 5 GHz), a rate 2 is used for the wake-up packet; or when the main transceiver and the wake-up receiver are on different operating frequency bands (the main transceiver is on 5 GHz and the wake-up radio is on 2.4 GHz), a rate 3 is used for the wake-up packet.

Optionally, in an embodiment, the receive end device may determine the data rate by using a result of negotiation between the main transceiver and the transmit end device. For example, the receive end device may send the QoS data frame, the QoS null frame, the beamforming report, or the like to the transmit end device, to inform the transmit end device of the data rate expected by the receive end device. If the transmit end device confirms that the data transmission rate expected by the receive end device can be used, the transmit end device sends an acknowledgment frame to the receive end device. After receiving the acknowledgment frame sent by the transmit end device, the receive end device considers that a data rate subsequently used by the transmit end device to transmit the wake-up packet is the data rate that is expected by the receive end device and that is previously fed back.

Optionally, in another embodiment, if the receive end device is the STA and the transmit end device is the AP, when the STA is associated with the AP, the AP directly specifies, based on a distance between the STA and the AP, a data rate used when the AP transmits the wake-up packet to the STA. The transmit end device may update the data rate by using a primary channel of main radio between the transmit end device and the main transceiver in a data exchange process, for example, update the data rate through interaction of an operation mode notification (Operation Mode Notification).

It should be noted that, in the foregoing solution in which the receive end device is informed of the data rate by using a method in which the SIG field carries the information used to indicate the data rate, data rates used by the transmit end device to send the preamble field, the SIG field, and the data field in the wake-up packet to the receive end device may be different, and a more robust data rate may be used for sending the preamble field and the SIG field.

In the foregoing other solutions for informing the receive end device of the data rate, the receive end device may parse the preamble field and the SIG field by using a specific data rate, and parse data based on the agreed-on, negotiated, or calculated data rate in the foregoing solutions. In this case, the transmit end device may send the preamble field and the data field by using different data rates, and send the preamble field by using a more robust data rate. Alternatively, the receive end device may parse the entire wake-up packet based on the agreed-on or negotiated data rate in the foregoing solutions. In this case, the transmit end device sends the preamble field and the data field by using a same data rate.

When the transmit end device sends the wake-up packet to the wake-up receiver of the receive end device, the transmit end device needs to inform the receive end device whether the currently sent wake-up packet is sent to the wake-up receiver of the receive end device. In this case, the data field part in the structure of the wake-up packet shown in FIG. 13 or FIG. 14 includes a MAC header field, where the MAC header field includes an identifier information field, and the identifier information field is used to carry identifier information of a receive end device. The identifier information may be a MAC address, an AID, or a partial (Partial) AID. To avoid unnecessary overheads caused by excessive information bits included in the identifier information field, a quantity of information bits included in the identifier information field may be positively correlated with a magnitude of the second data rate.

It is assumed that an identifier ID is an AID. In this case, a first bit of an AID of a receive end device needing a relatively low data rate is set to 1, and a first bit of an AID of another receive end device needing a relatively high data rate is set to 0. It is assumed that there are n receive end devices needing a relatively low data rate, an address information field only needs to include $1+\text{ceil}(\log_2(n))$ bits to distinguish between the receive end devices, where ceil( ) is a round-up function. Alternatively, more generally, first s bits of an AID are used to identify user groups with different data rates. For example, when s=2, 00 represents a user group with a maximum data rate, 01 represents a user group with a second largest data rate, 10 represents a user group with a third largest data rate, and 11 indicates a user group with a minimum data rate. A following bit combination is used to distinguish each user group, specifically as shown in FIG. 15. In addition, if the foregoing method for indicating the data rate is combined, when the wake-up packet carries the AID shown in FIG. 15, first two bits may not be transmitted.

Optionally, the MAC header field may further include a bit quantity indication field, and the bit quantity indication field is used to carry information indicating a quantity of information bits included in the identifier information field. The bit quantity indication field may indicate a specific quantity of information bits, or the bit quantity indication field may indicate a correspondence between a quantity of information bits and a data rate.

Further, when an ID is allocated to a receive end device needing a relatively low data rate, continuous occurrence of a plurality of symbols with a symbol energy of 0 should be avoided as much as possible, to reduce transmission of redundant information.

In all the foregoing embodiments, when the transmit end device sends the second WUP to the wake-up receiver of the receive end device by using the second data rate, the transmit end device modulates an information bit in the second WUP into a plurality of modulation symbols based on the second data rate, where the plurality of modulation symbols include a first modulation symbol whose symbol energy is 0 and a second modulation symbol whose symbol energy is not 0; and then the transmit end device sends the plurality of modulation symbols to the wake-up receiver of the receive end device.

Optionally, in an example, when the transmit end device sends a plurality of modulation symbols to the wake-up receiver of the receive end device, one placeholder (ON) symbol may be inserted at an interval of N modulation symbols to occupy a channel, so as to avoid the following case: The channel is in an idle state for a long time, and consequently, another receive end device preempts the channel, affecting transmission of the wake-up packet. Herein, N may be a fixed value. For example, N may be 4. Alternatively, N may be a value determined based on a symbol length of the modulation symbol. For example, it is assumed that the symbol length is x μs, and a communications system may accept a maximum time of y μs in which modulation symbols whose symbol energy is 0 are continuously sent (y may be specified in a standard in advance, or agreed on when the AP is associated with the STA). In this case, N=floor(y/x). It is assumed that x=4 and y=25. In this case, N=floor (25/4)=6. Alternatively, N has a one-to-one correspondence with a symbol length. For example, it may be agreed that a symbol length of 2 μs corresponds to N=12, a symbol length of 4 μs corresponds to N=6, and a symbol length of 8 μs corresponds to N=3.

Correspondingly, in a receiving process, each time the wake-up receiver of the receive end device receives N modulation symbols, the wake-up receiver of the receive end device ignores a next symbol. If N changes with the symbol length, the receive end device may learn of a current symbol length based on explicit or implicit indication of the transmit end device, and then determine N values based on the method for calculating N or the one-to-one correspondence between N and a symbol length that are mentioned above.

Optionally, in another example, when the transmit end device sends a plurality of modulation symbols to the wake-up receiver of the receive end device, one placeholder symbol may be inserted at an interval of N first modulation symbols whose symbol energy is 0, where selection of N is the same as the foregoing method. Details are not described herein again.

Correspondingly, each time the receive end device receives the N first modulation symbols whose symbol energy is 0, the receive end device ignores a next symbol.

It should be noted that the placeholder symbol in the foregoing does not carry an information bit, but a symbol energy of the placeholder symbol is not 0.

Optionally, the transmit end device may multiplex an OFDM transmitter to generate a plurality of time domain symbols corresponding to the information bit in the second WUP. A method for generating a time domain symbol whose symbol energy is not 0 is: generating, by the transmit end device, a time domain sequence s_pre, where values in s_pre have a same amplitude; performing fast Fourier transform (Fast Fourier Transform, FFT) on s_pre to obtain a frequency domain sequence s; filling s into a subcarrier on an operating frequency band of the wake-up receiver; and then performing IFFT on s to transform s into time domain and form a time domain symbol. A length of the time domain sequence s_pre may be determined based on a ratio of an operating bandwidth of the wake-up receiver to a subcarrier width. For example, if the operating bandwidth of the wake-up receiver is 4 M and the subcarrier width is 312.5 kHz, the length of s_pre is 13; or if the operating bandwidth of the wake-up receiver is 4 M and the subcarrier width is 78.125 kHz, the length of s_pre is 52. Optionally, for ease of operation of the FFT transform, the length of s_pre may be specified as an even number.

Alternatively, the transmit end device directly determines a frequency domain sequence s, where a distance between two neighboring non-zero values in the sequence s is n 0s, and n may be 1, 2, 3, or 4. For example, when n is 1, s may be represented as: s=[$s_1$, 0, $s_2$, 0, $s_3$, 0, $s_4$, . . . ].

In this embodiment of this application, optionally, as shown in FIG. 16, the transmit end device may send wake-up packets to different receive end devices by using different frequencies in one transmission. When generating time domain symbols corresponding to an information bit in a wake-up packet of each receive end device, the transmit end device may first multiply s of the wake-up packet of each receive end device by different twiddle factors. For example, the twiddle factor may be selected from [1, −1, j, −j], where 1 indicates no twiddling, −1 indicates twiddling by 180°, j indicates twiddling by 90°, and −j indicates twiddling by −90°. In a specific example, when four wake-up packets are simultaneously transmitted, twiddle factors corresponding to s sequences of the wake-up packets 1 to 4 are [1, −1, −1, −1], to be specific, s is filled into a subcarrier corresponding to the wake-up packet 1, and −s is filled into subcarriers corresponding to the wake-up packet 2 to the wake-up packet 4.

Alternatively, the transmit end device may generate a full bandwidth filling sequence s. When there is a wake-up packet on a corresponding frequency needing to be sent, a value at a position corresponding to s is filled into a corresponding subcarrier. For example, s uses an 1-stf sequence:

$$s_{-26,26} = \sqrt{1/2}\ \{0, 0, 1+j, 0, 0, 0, -1-j, 0, 0, 0, +j, 0, 0, 0, -1-j,$$
$$0, 0, 0, -1-j, 0, 0, 0, 1+j, 0, 0, 0, 0, 0, 0, -1-j, 0, 0, 0,$$
$$-1-j, 0, 0, 0, 1+j, 0, 0, 0, 1+j, 0, 0, 0, 1+j, 0, 0, 0, 1+j, 0, 0\}$$

When only the wake-up packet 1 needs to be transmitted, the value at the position corresponding to the full bandwidth filling sequence s is filled into the corresponding subcarrier. For example, a "0, 0, 1+j, 0, 0, 0, −1−j, 0, 0, 0, 1+j, 0, 0" sequence is filled into 13 subcarriers corresponding to 4 M.

With reference to FIG. 4 to FIG. 16, the foregoing describes in detail the method for transmitting a wake-up packet in a communications system according to the embodiments of this application. With reference to FIG. 17, the following describes in detail a transmit end device according to an embodiment of this application.

FIG. 17 shows a transmit end device 10 in a communications system according to an embodiment of this application. The communications system includes the transmit end device and a receive end device, and the receive end device includes a wake-up receive module and a main transceiver module. As shown in FIG. 17, the transmit end device 10 includes:

a transceiver module 11, configured to send a first wake-up packet WUP to the wake-up receive module by using a first data rate; and a determining module 12, configured to determine a second data rate, where the transceiver module 11 is further configured to send a second WUP to the wake-up receive module by using the second data rate.

Therefore, the transmit end device according to this embodiment of this application can send wake-up packets to the receive end device by using different data rates, so that the transmit end device can determine, based on a specific transmission condition in a communication process, a proper data rate for sending a wake-up packet, thereby improving efficiency of transmitting the wake-up packet.

In this embodiment of this application, optionally, in the aspect of sending the first wake-up packet to the wake-up receive module by using the first data rate, the transceiver module 11 is specifically configured to send the first WUP to the wake-up receive module by using a first symbol rate;

in the aspect of determining the second data rate, the determining module 12 is specifically configured to determine a second symbol rate; and in the aspect of sending the second WUP to the wake-up receive module by using the second data rate, the transceiver module 11 is specifically configured to send the second WUP to the wake-up receive module by using the second symbol rate.

In this embodiment of this application, optionally, in the aspect of sending the first wake-up packet WUP to the wake-up receive module by using the first data rate, the transceiver module 11 is specifically configured to send the first WUP to the wake-up receive module by using a first modulation and coding scheme;

in the aspect of determining the second data rate, the determining module 12 is specifically configured to determine a second modulation and coding scheme; and in the aspect of sending the second WUP to the wake-up receive module by using the second data rate, the transceiver module 11 is specifically configured to send the second WUP to the wake-up receive module by using the second modulation and coding scheme.

In this embodiment of this application, optionally, in the aspect of determining the second data rate, the determining module 12 is specifically configured to determine the second data rate based on a data rate used when the transmit end device 10 sends data to the main transceiver module.

In this embodiment of this application, optionally, in the aspect of determining the second data rate, the determining module 12 is specifically configured to determine the second data rate based on an operating frequency band of the main transceiver module and/or an operating frequency band of the wake-up receive module.

In this embodiment of this application, optionally, in the aspect of determining the second data rate, the determining module 12 is specifically configured to determine a symbol length corresponding to the second data rate based on a multipath delay spread.

In this embodiment of this application, optionally, in the aspect of determining the second data rate, the transceiver module 11 is configured to receive feedback information sent by the receive end device by using the main transceiver module; and the determining module 12 is configured to determine the second data rate based on the feedback information.

In this embodiment of this application, optionally, the feedback information includes first information used to indicate a signal-to-noise ratio on an operating frequency of the main transceiver module and/or the wake-up receive module; and in the aspect of determining the second data rate based on the feedback information, the determining module 12 is specifically configured to determine the second data rate based on the first information and a correspondence between a signal-to-noise ratio and a data rate.

In this embodiment of this application, optionally, the feedback information includes second information used to indicate a power of the first WUP when the first WUP arrives at the wake-up receive module, and in the aspect of determining the second data rate based on the feedback information, the determining module 12 is configured to determine the second data rate based on the second information and a preset power threshold; or the feedback information includes third information used to indicate a signal-to-noise ratio of the first WUP at the wake-up receive module, and in the aspect of determining the second data rate based on the feedback information, the determining module 12 is configured to determine the second data rate based on the third information and a preset signal-to-noise ratio threshold; or the feedback information includes fourth information used to indicate a packet error rate of the first WUP at the wake-up receive module, and in the aspect of determining the second data rate based on the feedback information, the determining module 12 is configured to determine the second data rate based on the fourth information and a preset packet error rate threshold.

In this embodiment of this application, optionally, in the aspect of receiving the feedback information sent by the receive end device by using the main transceiver module, the transceiver module 11 is specifically configured to receive a medium access control MAC frame sent by the receive end device by using the main transceiver module, where the MAC frame carries the feedback information.

In this embodiment of this application, optionally, in the aspect of receiving the medium access control MAC frame sent by the receive end device by using the main transceiver module, the transceiver module 11 is specifically configured to: receive a quality of service QoS data frame sent by the receive end device by using the main transceiver module, where the QoS data frame includes a high throughput control field, and the high throughput control field carries the feedback information; or receive a QoS null frame sent by the receive end device by using the main transceiver module, where the QoS null frame includes a high efficiency aggregated control field, and the high efficiency aggregated control field carries the feedback information; or receive a beamforming report sent by the receive end device by using the main transceiver module, where the beamforming report includes a feedback field, and the feedback field carries the feedback information.

In this embodiment of this application, optionally, in the aspect of sending the second WUP to the wake-up receive module by using the second data rate, the transceiver module 11 is specifically configured to: modulate an information bit in the second WUP into a plurality of modulation symbols based on the second data rate, where the plurality of modulation symbols include a first modulation symbol whose symbol energy is 0 and a second modulation symbol whose symbol energy is not 0; and send the plurality of modulation symbols to the wake-up receive module.

In this embodiment of this application, optionally, in the aspect of sending the plurality of modulation symbols to the wake-up receive module, the transceiver module 11 is specifically configured to: send the plurality of modulation symbols to the wake-up receive module in a manner of sending one placeholder symbol to the wake-up receive module each time the transceiver module sends a first preset quantity of modulation symbols to the wake-up receive module, where the placeholder symbol does not carry an information bit, and a symbol energy of the placeholder symbol is not 0; or send the plurality of modulation symbols to the wake-up receive module in a manner of sending one placeholder symbol to the wake-up receive module each time the transceiver module sends a second preset quantity of first modulation symbols to the wake-up receive module, where the placeholder symbol does not carry an information bit, and a symbol energy of the placeholder symbol is not 0.

In this embodiment of this application, optionally, the second WUP includes a signaling field and a data field that are arranged in a sending time sequence, and the signaling field carries indication information used to indicate the second data rate.

In this embodiment of this application, optionally, the second WUP further includes a redundancy field, and a sending time of the redundancy field is after a sending time of the signaling field and before a sending time of the data field.

In this embodiment of this application, optionally, the second WUP includes a preamble field and a data field that are in a sending time sequence, so that the receive end device determines the second data rate based on a preamble mode corresponding to the preamble field and a preset correspondence, where the preset correspondence includes a correspondence between a preamble mode and a data rate.

In this embodiment of this application, optionally, the second WUP includes a MAC header field, the MAC header field includes an identifier information field, the identifier information field is used to carry identifier information of the receive end device, and the determining module 12 is further configured to determine, based on the second data rate, a quantity of information bits included in the identifier information field, where the quantity of information bits included in the identifier information field is positively correlated with a magnitude of the second data rate.

It should be understood that the transmit end device 10 according to this embodiment of this application may correspondingly perform the method 100 for transmitting a wake-up packet in a communications system in the embodiments of this application, and the foregoing and other operations and/or functions of each module in the transmit end device 10 are respectively used to implement corresponding procedures executed by the transmit end device in the method 100. For brevity, details are not described herein again.

Figure 18:
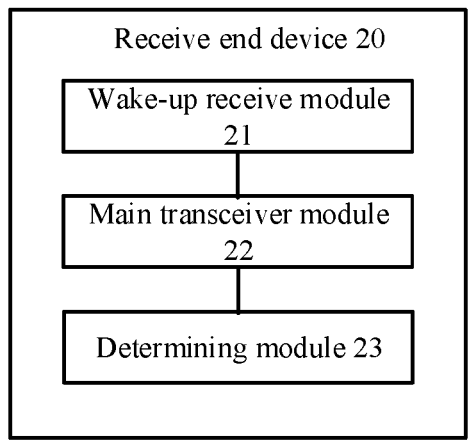
FIG. 18 is a schematic block diagram of a receive end device according to an embodiment of this application.

FIG. 18 shows a receive end device 20 in a communications system according to an embodiment of this application. The communications system includes a transmit end device and the receive end device. As shown in FIG. 18, the receive end device 20 includes a wake-up receive module 21, a main receive module 22, and a determining module 23.

The wake-up receive module 21 is configured to receive a first wake-up packet WUP sent by the transmit end device by using a first data rate.

The wake-up receive module 21 is further configured to receive a second WUP sent by the transmit end device by using a second data rate.

The determining module 23 is configured to determine the second data rate.

The determining module 23 is further configured to parse the second WUP based on the second data rate.

Therefore, the receive end device in a communications system according to this embodiment of this application receives wake-up packets sent by the transmit end device by using different data rates, and the transmit end device can determine, based on a specific transmission condition in a communication process, a proper data rate for sending a wake-up packet, thereby improving efficiency of transmitting the wake-up packet.

In this embodiment of this application, optionally, in the aspect of receiving the first wake-up packet WUP sent by the transmit end device by using the first data rate, the wake-up receive module 21 is specifically configured to receive the first WUP sent by the transmit end device by using a first symbol rate;

in the aspect of receiving the second WUP sent by the transmit end device by using the second data rate, the wake-up receive module 21 is configured to receive the second WUP sent by the transmit end device by using a second symbol rate; in the aspect of determining the second data rate, the determining module 23 is specifically configured to determine the second symbol rate; and in the aspect of parsing the second WUP based on the second data rate, the determining module 23 is specifically configured to parse the second WUP based on the second symbol rate.

In this embodiment of this application, optionally, in the aspect of receiving the first wake-up packet WUP sent by the transmit end device by using the first data rate, the wake-up receive module 21 is specifically configured to receive the first WUP sent by the transmit end device by using a first modulation and coding scheme; in the aspect of receiving the second WUP sent by the transmit end device by using the second data rate, the wake-up receive module 21 is specifically configured to receive the second WUP sent by the transmit end device by using a second modulation and coding scheme; in the aspect of determining the second data rate, the determining module 23 is specifically configured to determine the second modulation and coding scheme; and in the aspect of parsing the second WUP based on the second data rate, the determining module 23 is specifically configured to parse the second WUP based on the second modulation and coding scheme.

In this embodiment of this application, optionally, the main receive module 22 is specifically configured to send feedback information to the transmit end device, so that the transmit end device determines the second data rate based on the feedback information.

In this embodiment of this application, optionally, the feedback information includes first information used to indicate a signal-to-noise ratio on an operating frequency of the main transceiver module and/or the wake-up receive module, so that the transmit end device determines the second data rate based on the first information and a correspondence between a signal-to-noise ratio and a data rate.

In this embodiment of this application, optionally, the feedback information includes second information used to indicate a power of the first WUP when the first WUP arrives at the wake-up receive module, so that the transmit end device determines the second data rate based on the second information and a preset power threshold; or the feedback information includes third information used to indicate a signal-to-noise ratio of the first WUP at the wake-up receive module, so that the transmit end device determines the second data rate based on the third information and a preset signal-to-noise ratio threshold; or the feedback information includes fourth information used to indicate a packet error rate of the first WUP at the wake-up receive module, so that the transmit end device determines the second data rate based on the fourth information and a preset packet error rate threshold.

In this embodiment of this application, optionally, in the aspect of sending the feedback information to the transmit end device, the main transceiver module 22 is configured to send a medium access control MAC frame to the transmit end device, where the MAC frame carries the feedback information.

In this embodiment of this application, optionally, in the aspect of sending the medium access control MAC frame to the transmit end device, the main transceiver module 22 is specifically configured to: send a quality of service QoS data frame to the transmit end device, where the QoS data frame includes a high throughput control field, and the high throughput control field carries the feedback information; or send a QoS null frame to the transmit end device, where the QoS null frame includes a high efficiency aggregated control field, and the high efficiency aggregated control field carries the feedback information; or send a beamforming report to the transmit end device, where the beamforming report includes a feedback field, and the feedback field carries the feedback information.

In this embodiment of this application, optionally, in the aspect of receiving the second WUP sent by the transmit end device by using the second data rate, the wake-up receive module 21 is specifically configured to receive a plurality of modulation symbols sent by the transmit end device, where the plurality of modulation symbols are obtained by the transmit end device by modulating an information bit in the second WUP based on the second data rate, and the plurality of modulation symbols include a first modulation symbol whose symbol energy is 0 and a second modulation symbol whose symbol energy is not 0.

In this embodiment of this application, optionally, the plurality of modulation symbols are sent by the transmit end device in a manner of sending one placeholder symbol to the wake-up receive module 21 each time the transmit end device sends a first preset quantity of modulation symbols to the wake-up receive module 21, the placeholder symbol does not carry an information bit, and a symbol energy of the placeholder symbol is not 0; and in the aspect of receiving the plurality of modulation symbols sent by the transmit end device, the wake-up receive module 21 is specifically configured to receive the plurality of modulation symbols in a manner of ignoring the placeholder symbol each time the wake-up receive module 21 receives the first preset quantity of modulation symbols.

In this embodiment of this application, optionally, the plurality of modulation symbols are sent by the transmit end device in a manner of sending one placeholder symbol to the wake-up receive module 21 each time the transmit end device sends a second preset quantity of second modulation symbols to the wake-up receive module 21, the placeholder symbol does not carry an information bit, and a symbol energy of the placeholder symbol is not 0; and in the aspect of receiving the plurality of modulation symbols sent by the transmit end device, the wake-up receive module 21 is specifically configured to receive the plurality of modulation symbols in a manner of ignoring the placeholder symbol each time the wake-up receive module 21 receives the second preset quantity of second modulation symbols.

In this embodiment of this application, optionally, the second WUP includes a signaling field and a data field that are arranged in a sending time sequence, and the signaling field carries indication information used to indicate the second data rate; and in the aspect of determining the second data rate, the determining module 23 is specifically configured to determine the second data rate based on the indication information.

In this embodiment of this application, optionally, the second WUP further includes a redundancy field, and a sending time of the redundancy field is after a sending time of the signaling field and before a sending time of the data field.

In this embodiment of this application, optionally, the second WUP includes a preamble field and a data field that are in a sending time sequence; and in the aspect of determining the second data rate, the determining module 23 is specifically configured to determine the second data rate based on a preamble mode corresponding to the preamble field and a preset correspondence, where the preset correspondence includes a correspondence between a preamble mode and a data rate.

In this embodiment of this application, optionally, the second WUP includes a MAC header field, the MAC header field includes an identifier information field, the identifier information field is used to carry identifier information of the receive end device, and a quantity of information bits included in the identifier information field is positively correlated with a magnitude of the second data rate.

It should be understood that the receive end device 20 according to this embodiment of this application may correspondingly perform the method 100 for transmitting a wake-up packet in a communications system in the embodiments of this application, and the foregoing and other operations and/or functions of each module in the receive end device 20 are respectively used to implement corresponding procedures executed by the receive end device in the method 100. For brevity, details are not described herein again.

Figure 19:
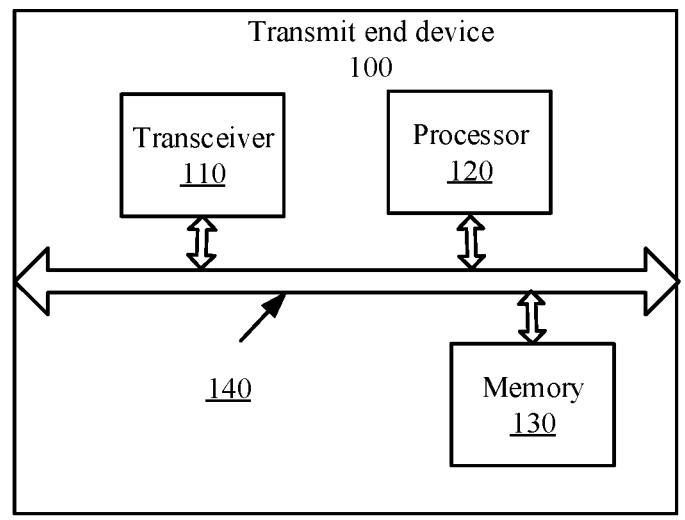
FIG. 19 is a schematic block diagram of a transmit end device according to another embodiment of this application.

FIG. 19 is a schematic structural diagram of a transmit end device 100 in a communications system according to another embodiment of this application. The communications system includes the transmit end device and a receive end device, and the receive end device includes a wake-up receiver and a main transceiver. The transmit end device in FIG. 19 may execute a procedure executed by the transmit end device in each procedure in the method 100. The transmit end device 100 in FIG. 19 includes a transceiver 110, a processor 120, and a memory 130. The processor 120 controls an operation of the transmit end device 100, and may be configured to process a signal. The memory 130 may include a read-only memory and a random access memory, and provide an instruction and data for the processor 120. Components of the transmit end device 100 are coupled together by using a bus system 140. In addition to a data bus, the bus system 140 further includes a power bus, a control bus, and a status signal bus. However, for clear description, various types of buses in the figure are marked as the bus system 140.

Specifically, the transceiver 110 is configured to send a first wake-up packet WUP to the wake-up receive module by using a first data rate; the processor 120 is configured to determine a second data rate; and the transceiver 110 is further configured to send a second WUP to the wake-up receive module by using the second data rate.

It should be understood that in this embodiment of this application, the processor 120 may be a central processing unit (Central Processing Unit, CPU), or the processor 120 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 130 may include a read-only memory and a random access memory, and provide an instruction and data for the processor 120. A part of the memory 130 may further include a non-volatile random access memory. For example, the memory 130 may further store information of a device type.

In addition to a data bus, the bus system 140 may further include a power bus, a control bus, a status signal bus, and the like. However, for clear description, various types of buses in the figure are marked as the bus system 140.

In an implementation process, steps in the foregoing methods can be implemented by using a hardware integrated logical circuit in the processor 120, or by using instructions in a form of software. The steps of the methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 130, and a processor 120 reads information in the memory 130 and completes the steps in the foregoing methods in combination with hardware of the processor. To avoid repetition, details are not described herein again.

Optionally, in an embodiment, in the aspect of sending the first wake-up packet to the wake-up receiver by using the first data rate, the transceiver 110 is specifically configured to send the first WUP to the wake-up receiver by using a first symbol rate;
  in the aspect of determining the second data rate, the processor 120 is specifically configured to determine a second symbol rate; and
  in the aspect of sending the second WUP to the wake-up receiver by using the second data rate, the transceiver 110 is specifically configured to send the second WUP to the wake-up receiver by using the second symbol rate.

Optionally, in an embodiment, in the aspect of sending the first wake-up packet WUP to the wake-up receiver by using the first data rate, the transceiver 110 is specifically configured to send the first WUP to the wake-up receiver by using a first modulation and coding scheme;
  in the aspect of determining the second data rate, the processor 120 is specifically configured to determine a second modulation and coding scheme; and
  in the aspect of sending the second WUP to the wake-up receiver by using the second data rate, the transceiver 110 is specifically configured to send the second WUP to the wake-up receiver by using the second modulation and coding scheme.

Optionally, in an embodiment, in the aspect of determining the second data rate, the processor 120 is specifically configured to determine the second data rate based on a data rate used when the transmit end device 100 sends data to the main transceiver.

Optionally, in an embodiment, in the aspect of determining the second data rate, the processor 120 is specifically configured to determine the second data rate based on an operating frequency band of the main transceiver and/or the wake-up receiver.

Optionally, in an embodiment, in the aspect of determining the second data rate, the processor 120 is specifically configured to determine a symbol length corresponding to the second data rate based on a multipath delay spread.

Optionally, in an embodiment, in the aspect of determining the second data rate, the transceiver 110 is configured to receive feedback information sent by the receive end device by using the main transceiver; and
  the processor 120 is configured to determine the second data rate based on the feedback information.

Optionally, in an embodiment, the feedback information includes first information used to indicate a signal-to-noise ratio on an operating frequency of the main transceiver and/or the wake-up receiver; and
  in the aspect of determining the second data rate based on the feedback information, the processor 120 is specifically configured to determine the second data rate based on the first information and a correspondence between a signal-to-noise ratio and a data rate.

Optionally, in an embodiment, the feedback information includes second information used to indicate a power of the first WUP when the first WUP arrives at the wake-up receiver, and in the aspect of determining the second data rate based on the feedback information, the processor 120 is configured to determine the second data rate based on the second information and a preset power threshold; or
  the feedback information includes third information used to indicate a signal-to-noise ratio of the first WUP at the wake-up receiver, and in the aspect of determining the second data rate based on the feedback information, the processor 120 is configured to determine the second data rate based on the third information and a preset signal-to-noise ratio threshold; or
  the feedback information includes fourth information used to indicate a packet error rate of the first WUP at the wake-up receiver, and in the aspect of determining the second data rate based on the feedback information, the processor 120 is configured to determine the second data rate based on the fourth information and a preset packet error rate threshold.

Optionally, in an embodiment, in the aspect of receiving the feedback information sent by the receive end device by using the main transceiver, the transceiver 110 is specifically configured to receive a medium access control MAC frame sent by the receive end device by using the main transceiver, where the MAC frame carries the feedback information.

Optionally, in an embodiment, in the aspect of receiving the medium access control MAC frame sent by the receive end device by using the main transceiver, the transceiver 110 is specifically configured to: receive a quality of service QoS data frame sent by the receive end device by using the main transceiver, where the QoS data frame includes a high throughput control field, and the high throughput control field carries the feedback information; or receive a QoS null frame sent by the receive end device by using the main transceiver, where the QoS null frame includes a high efficiency aggregated control field, and the high efficiency aggregated control field carries the feedback information; or receive a beamforming report sent by the receive end device by using the main transceiver, where the beamforming report includes a feedback field, and the feedback field carries the feedback information.

Optionally, in an embodiment, in the aspect of sending the second WUP to the wake-up receiver by using the second data rate, the transceiver 110 is specifically configured to: modulate an information bit in the second WUP into a plurality of modulation symbols based on the second data rate, where the plurality of modulation symbols include a first modulation symbol whose symbol energy is 0 and a second modulation symbol whose symbol energy is not 0; and send the plurality of modulation symbols to the wake-up receive module.

Optionally, in an embodiment, in the aspect of sending the plurality of modulation symbols to the wake-up receiver, the transceiver 110 is specifically configured to: send the plurality of modulation symbols to the wake-up receiver in a manner of sending one placeholder symbol to the wake-up receiver each time the transceiver 110 sends a first preset quantity of modulation symbols to the wake-up receiver, where the placeholder symbol does not carry an information bit, and a symbol energy of the placeholder symbol is not 0; or send the plurality of modulation symbols to the wake-up receiver in a manner of sending one placeholder symbol to the wake-up receiver each time the transceiver 110 sends a second preset quantity of first modulation symbols to the wake-up receiver, where the placeholder symbol does not carry an information bit, and a symbol energy of the placeholder symbol is not 0.

Optionally, in an embodiment, the second WUP includes a signaling field and a data field that are arranged in a sending time sequence, and the signaling field carries indication information used to indicate the second data rate.

Optionally, in an embodiment, the second WUP further includes a redundancy field, and a sending time of the redundancy field is after a sending time of the signaling field and before a sending time of the data field.

Optionally, in an embodiment, the second WUP includes a preamble field and a data field that are in a sending time sequence, so that the receive end device determines the second data rate based on a preamble mode corresponding to the preamble field and a preset correspondence, where the preset correspondence includes a correspondence between a preamble mode and a data rate.

Optionally, in an embodiment, the second WUP includes a MAC header field, the MAC header field includes an identifier information field, the identifier information field is used to carry identifier information of the receive end device, and the processor 120 is further configured to determine, based on the second data rate, a quantity of information bits included in the identifier information field, where the quantity of information bits included in the identifier information field is positively correlated with a magnitude of the second data rate.

It should be understood that the transmit end device 100 according to this embodiment of this application may correspond to the transmit end device 10 in the embodiments of this application, and may correspond to a corresponding entity for executing the method for transmitting a wake-up packet in a communications system according to the embodiments of this application, and the foregoing and other operations and/or functions of each module in the transmit end device 100 are respectively used to implement corresponding procedures in the method 100. For brevity, details are not described herein again.

Therefore, the transmit end device according to this embodiment of this application can send wake-up packets to the receive end device by using different data rates, so that the transmit end device can determine, based on a specific transmission condition in a communication process, a proper data rate for sending a wake-up packet, thereby improving efficiency of transmitting the wake-up packet.

Figure 20:
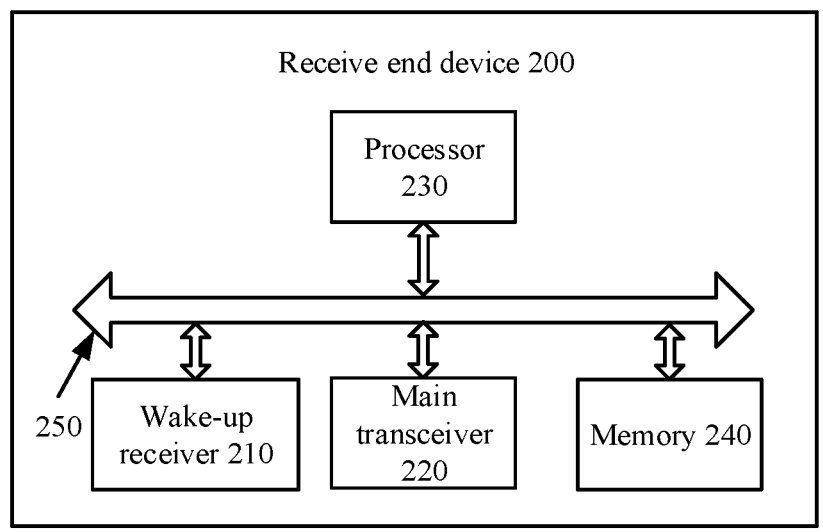
FIG. 20 is a schematic block diagram of a receive end device according to another embodiment of this application.

FIG. 20 is a schematic structural diagram of a receive end device 200 in a communications system according to another embodiment of this application. The communications system includes a transmit end device and the receive end device. The receive end device in FIG. 20 may execute a procedure executed by the receive end device in each procedure in the method 100. The receive end device 200 in FIG. 20 includes a wake-up receiver 210, a main transceiver 220, a processor 230, and a memory 240. The processor 230 controls an operation of the receive end device 200, and may be configured to process a signal. The memory 240 may include a read-only memory and a random access memory, and provide an instruction and data for the processor 230. Components of the receive end device 200 are coupled together by using a bus system 250. In addition to a data bus, the bus system 250 further includes a power bus, a control bus, and a status signal bus. However, for clear description, various types of buses in the figure are marked as the bus system 250.

Specifically, the wake-up receiver 210 is configured to receive a first wake-up packet WUP sent by the transmit end device by using a first data rate; the wake-up receiver 210 is further configured to receive a second WUP sent by the transmit end device by using a second data rate; the processor 230 is configured to determine the second data rate; and the processor 230 is further configured to parse the second WUP based on the second data rate.

It should be understood that in this embodiment of this application, the processor 230 may be a central processing unit (Central Processing Unit, CPU), or the processor 230 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 240 may include a read-only memory and a random access memory, and provide an instruction and data for the processor 230. A part of the memory 240 may further include a non-volatile random access memory. For example, the memory 240 may further store information of a device type.

In addition to a data bus, the bus system 250 may further include a power bus, a control bus, a status signal bus, and the like. However, for clear description, various types of buses in the figure are marked as the bus system 250.

In an implementation process, steps in the foregoing methods can be implemented by using a hardware integrated logical circuit in the processor 230, or by using instructions in a form of software. The steps of the methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 240, and a processor 230 reads information in the memory 240 and completes the steps in the foregoing methods in combination with hardware of the processor. To avoid repetition, details are not described herein again.

Optionally, in an embodiment, in the aspect of receiving the first wake-up packet WUP sent by the transmit end device by using the first data rate, the wake-up receiver 210 is specifically configured to receive the first WUP sent by the transmit end device by using a first symbol rate;

in the aspect of receiving the second WUP sent by the transmit end device by using the second data rate, the wake-up receiver 210 is configured to receive the second WUP sent by the transmit end device by using a second symbol rate; in the aspect of determining the second data rate, the processor 230 is specifically configured to determine the second symbol rate; and in the aspect of parsing the second WUP based on the second data rate, the processor 230 is specifically configured to parse the second WUP based on the second symbol rate.

Optionally, in an embodiment, in the aspect of receiving the first wake-up packet WUP sent by the transmit end device by using the first data rate, the wake-up receiver 210 is specifically configured to receive the first WUP sent by the transmit end device by using a first modulation and coding scheme; in the aspect of receiving the second WUP sent by the transmit end device by using the second data rate, the wake-up receiver 210 is specifically configured to receive the second WUP sent by the transmit end device by using the second modulation and coding scheme; in the aspect of determining the second data rate, the processor 230 is specifically configured to determine the second modulation and coding scheme; and in the aspect of parsing the second WUP based on the second data rate, the processor 230 is specifically configured to parse the second WUP based on the second modulation and coding scheme.

Optionally, in an embodiment, the main transceiver 220 is specifically configured to send feedback information to the transmit end device, so that the transmit end device determines the second data rate based on the feedback information.

Optionally, in an embodiment, the feedback information includes first information used to indicate a signal-to-noise ratio on an operating frequency of the main transceiver 220 and/or the wake-up receiver 210, so that the transmit end device determines the second data rate based on the first information and a correspondence between a signal-to-noise ratio and a data rate.

Optionally, in an embodiment, the feedback information includes second information used to indicate a power of the first WUP when the first WUP arrives at the wake-up receiver, so that the transmit end device determines the second data rate based on the second information and a preset power threshold; or the feedback information includes third information used to indicate a signal-to-noise ratio of the first WUP at the wake-up receiver, so that the transmit end device determines the second data rate based on the third information and a preset signal-to-noise ratio threshold; or the feedback information includes fourth information used to indicate a packet error rate of the first WUP at the wake-up receiver, so that the transmit end device determines the second data rate based on the fourth information and a preset packet error rate threshold.

Optionally, in an embodiment, in the aspect of sending the feedback information to the transmit end device, the main transceiver 220 is configured to send a medium access control MAC frame to the transmit end device, where the MAC frame carries the feedback information.

Optionally, in an embodiment, in the aspect of sending the medium access control MAC frame to the transmit end device, the main transceiver 220 is specifically configured to: send a quality of service QoS data frame to the transmit end device, where the QoS data frame includes a high throughput control field, and the high throughput control field carries the feedback information; or send a QoS null frame to the transmit end device, where the QoS null frame includes a high efficiency aggregated control field, and the high efficiency aggregated control field carries the feedback information; or send a beamforming report to the transmit end device, where the beamforming report includes a feedback field, and the feedback field carries the feedback information.

Optionally, in an embodiment, in the aspect of receiving the second WUP sent by the transmit end device by using the second data rate, the wake-up receiver 210 is specifically configured to receive a plurality of modulation symbols sent by the transmit end device, where the plurality of modulation symbols are obtained by the transmit end device by modulating an information bit in the second WUP based on the second data rate, and the plurality of modulation symbols include a first modulation symbol whose symbol energy is 0 and a second modulation symbol whose symbol energy is not 0.

Optionally, in an embodiment, the plurality of modulation symbols are sent by the transmit end device in a manner of sending one placeholder symbol to the wake-up receiver 210 each time the transmit end device sends a first preset quantity of modulation symbols to the wake-up receiver 210, the placeholder symbol does not carry an information bit, and a symbol energy of the placeholder symbol is not 0; and in the aspect of receiving the plurality of modulation symbols sent by the transmit end device, the wake-up receiver 210 is specifically configured to receive the plurality of modulation symbols in a manner of ignoring the placeholder symbol each time the wake-up receiver 210 receives the first preset quantity of modulation symbols.

Optionally, in an embodiment, the plurality of modulation symbols are sent by the transmit end device in a manner of sending one placeholder symbol to the wake-up receiver 210 each time the transmit end device sends a second preset quantity of second modulation symbols to the wake-up receiver 210, the placeholder symbol does not carry an information bit, and a symbol energy of the placeholder symbol is not 0; and in the aspect of receiving the plurality of modulation symbols sent by the transmit end device, the wake-up receiver 210 is specifically configured to receive the plurality of modulation symbols in a manner of ignoring the placeholder symbol each time the wake-up receiver 210 receives the second preset quantity of second modulation symbols.

Optionally, in an embodiment, the second WUP includes a signaling field and a data field that are arranged in a sending time sequence, and the signaling field carries indication information used to indicate the second data rate; and in the aspect of determining the second data rate, the processor 230 is specifically configured to determine the second data rate based on the indication information.

Optionally, in an embodiment, the second WUP further includes a redundancy field, and a sending time of the redundancy field is after a sending time of the signaling field and before a sending time of the data field.

Optionally, in an embodiment, the second WUP includes a preamble field and a data field that are in a sending time sequence; and in the aspect of determining the second data rate, the processor 230 is specifically configured to determine the second data rate based on a preamble mode corresponding to the preamble field and a preset correspondence, where the preset correspondence includes a correspondence between a preamble mode and a data rate.

Optionally, in an embodiment, the second WUP includes a MAC header field, the MAC header field includes an identifier information field, the identifier information field is used to carry identifier information of the receive end device, and a quantity of information bits included in the identifier information field is positively correlated with a magnitude of the second data rate.

It should be understood that the receive end device 200 according to this embodiment of this application may correspond to the receive end device 20 in the embodiments of this application, and may correspond to a corresponding entity for executing the method for transmitting a wake-up packet in a communications system according to the embodiments of this application, and the foregoing and other operations and/or functions of each module in the receive end device 200 are respectively used to implement corresponding procedures in the method 100. For brevity, details are not described herein again.

Therefore, the receive end device in a communications system according to this embodiment of this application receives wake-up packets sent by the transmit end device by using different data rates, and the transmit end device can determine, based on a specific transmission condition in a communication process, a proper data rate for sending a wake-up packet, thereby improving efficiency of transmitting the wake-up packet.

It should be understood that "one embodiment" or "an embodiment" mentioned in the entire specification does not mean that particular features, structures, or characteristics related to this embodiment are included in at least one embodiment of this application. Therefore, "in one embodiment" or "in an embodiment" appearing throughout this specification does not necessarily refer to a same embodiment. In addition, these particular features, structures, or characteristics may be combined in one or more embodiments in any appropriate manner.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

Methods or steps described in the embodiments disclosed in this specification may be implemented by hardware, a software program executed by a processor, or a combination thereof. The software program may be deployed in a random access memory (Random Access Memory, RAM), a memory, a read-only memory (Read-Only Memory, ROM), an electrically programmable read-only memory (Electrically Programmable Read-Only Memory, EPROM), an electrically erasable programmable read-only memory (Electrically Erasable Programmable Read-Only Memory, EEPROM), a register, a hard disk, a removable disk, a compact disc read-only memory (Compact Disc Read-Only Memory, CD-ROM), or any other form of storage medium known in the technical field.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

This application is described in detail with reference to the accompany drawings and in combination with the example embodiments, but this application is not limited thereto. Various equivalent modifications or replacements can be made to the embodiments of this application by a person of ordinary skill in the art without departing from essence of this application, and the modifications or replacements shall fall within the scope of this application.

The invention claimed is:

1. A wake-up packet transmission method, wherein the method comprises:

generating, by a transmit end device, a wake-up packet (WUP), wherein the WUP is used to wake up a main transceiver of a receive end device and the WUP comprises a wake-up preamble field and a data field, and the wake-up preamble field of the WUP is transmitted before the data field of the WUP, and the wake-up preamble field is used to indicate a transmission rate of the data field, and wherein the wake-up preamble field is used by the receive end device to perform time synchronization; and sending, by the transmit end device, the WUP, wherein the data field of the WUP is sent using the transmission rate indicated by the preamble field, wherein in response to a sequence included in the wake-up preamble field, the receive end device performs time synchronization based on the sequence and determines the transmission rate of the data field of the WUP based on the sequence, and wherein the transmission rate is indicated by the wake-up preamble field based on a correspondence between the sequence and the transmission rate.

2. The method according to claim 1, wherein the transmission rate is indicated as a first rate when the preamble mode corresponding to the preamble field is a first mode, or the transmission rate is indicated as a second rate when the preamble mode corresponding to the preamble field is a second mode.

3. The method according to claim 2, wherein the sequence with a first length indicates a first data rate, and the sequence with a second length indicates a second data rate, and the first length is different from the second length.

4. The method according to claim 1, the sending the WUP, comprises:
sending the WUP by using a first frequency channel and a second frequency channel.

5. The method according to claim 1, wherein the sending the WUP, comprises:
sending the preamble field and the data field of the WUP to the receive end device by using 13 subcarriers, wherein a subcarrier width is 312.5 kHz.

6. The method according to claim 1, wherein the transmission rate of the data field is implemented by using a symbol rate or an MCS.

7. The method according to claim 1, wherein the sending the WUP comprises:
modulating the preamble field in the WUP into a plurality of modulation symbols, wherein the plurality of modulation symbols comprise a first modulation symbol whose symbol energy is 0 and a second modulation symbol whose symbol energy is not 0; and
sending the plurality of modulation symbols to the receive end device.

8. The method according to claim 1, wherein the data field of the WUP comprises a MAC header field, and the MAC header field comprises an identification information field, and the identification information field contains identification information of the receive end device.

9. The method according to claim 1, wherein the wake-up preamble field and the data field in the WUP are transmitted using different transmission rates.

10. A method, wherein the method comprises:
receiving, by a receive end device, a preamble of a wake-up packet (WUP) from a transmit end device, wherein the WUP is used to wake up a main transceiver of the receive end device and the WUP comprises a preamble field and a data field, and the wake-up preamble field of the WUP is transmitted before the data field of the WUP, and the preamble field is used to indicate a transmission rate of the data field of the WUP, and wherein the preamble field is used by the receive end device to perform time synchronization; and
receiving, by a receive end device, the data field, wherein the data field of the WUP is sent using the transmission rate indicated by the preamble field,
wherein in response to a sequence included in the wake-up preamble field, the receive end device performs time synchronization based on the sequence and determines the transmission rate of the data field of the WUP based on the sequence, and wherein the transmission rate is indicated by the wake-up preamble field based on a correspondence between the sequence and the transmission rate.

11. The method according to claim 10, wherein the transmission rate is indicated as a first rate when the preamble mode corresponding to the preamble field is a first mode, or the transmission rate is indicated as a second rate when the preamble mode corresponding to the preamble field is a second mode.

12. The method according to claim 11, wherein the sequence with a first length indicates a first data rate, and the sequence with a second length indicates a second data rate, and the first length is different from the second length.

13. The method according to claim 10, the receiving the preamble of the WUP, comprises:
receiving the preamble of the WUP on a first frequency channel and a second frequency channel.

14. The method according to claim 10, wherein the transmission rate of the data field is implemented by using an MCS.

15. The method according to claim 10, wherein the receiving the preamble field comprises:
receiving a plurality of modulation symbols, wherein the multiple modulation symbols is obtained by modulating the preamble field into a plurality of modulation symbols, and wherein the plurality of modulation symbols comprise a first modulation symbol whose symbol energy is 0 and a second modulation symbol whose symbol energy is not 0.

16. The method according to claim 10, wherein the data field of the WUP comprises a MAC header field, and the MAC header field comprises an identification information field, and the identification information field contains identification information of the receive end device.

17. The method according to claim 10, wherein the wake-up preamble field and the data field in the WUP are transmitted by the transmit end device using different transmission rates.

18. A transmit end device, comprising:
a processor and a transceiver coupled to the processor;
the processor is configured to:
generate a wake-up packet (WUP), wherein the WUP is used to wake up a main transceiver of a receive end device and the WUP comprises a wake-up preamble field and a data field, and the wake-up preamble field is used to indicate a transmission rate of the data field, and wherein the wake-up preamble field is used by the receive end device to perform and time synchronization, and the wake-up preamble field of the WUP is transmitted before the data field of the WUP; and
send the WUP, wherein the data field of the WUP is sent using the transmission rate indicated by the preamble field, wherein in response to an additional sequence included in the wake-up preamble field, the receive end device performs time synchronization based on the sequence and determines the transmission rate of the data field of the WUP based on the additional sequence,
wherein the transmission rate is indicated by the wake-up preamble field based on a correspondence between the sequence and the transmission rate.

19. The transmit end device according to claim 18, wherein the processor is configured to transmit the wake-up preamble field and the data field in the WUP using different transmission rates.

20. The transmit end device according to claim 18, wherein the transmission rate of the data field is implemented by using a symbol rate or an MCS.

* * * * *